United States Patent
Difrancesco et al.

(10) Patent No.: US 10,435,639 B2
(45) Date of Patent: *Oct. 8, 2019

(54) FUEL ADDITIVE CONTAINING LATTICE ENGINEERED CERIUM DIOXIDE NANOPARTICLES

(75) Inventors: Albert Gary Difrancesco, Rochester, NY (US); Thomas D. Allston, Lima, NY (US); Richard K. Hailstone, North Chili, NY (US); Andreas Langner, Pittsford, NY (US); Kenneth J. Reed, Rochester, NY (US)

(73) Assignee: Cerion, LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/140,648

(22) PCT Filed: Dec. 17, 2008

(86) PCT No.: PCT/US2008/087133
§ 371 (c)(1),
(2), (4) Date: Jan. 30, 2012

(87) PCT Pub. No.: WO2010/071641
PCT Pub. Date: Jun. 24, 2010

(65) Prior Publication Data
US 2012/0124899 A1    May 24, 2012

Related U.S. Application Data

(60) Provisional application No. 60/824,514, filed on Sep. 5, 2006, provisional application No. 60/911,159, filed
(Continued)

(51) Int. Cl.
*C10L 1/12* (2006.01)
*B01J 23/00* (2006.01)
(Continued)

(52) U.S. Cl.
CPC ........... *C10L 1/1241* (2013.01); *B01J 23/002* (2013.01); *B01J 23/10* (2013.01); *B01J 23/83* (2013.01);
(Continued)

(58) Field of Classification Search
CPC ........ B01J 23/10; B01J 13/0047; B01J 20/06; B01J 23/002
(Continued)

(56) References Cited

U.S. PATENT DOCUMENTS 1,592,713 A    7/1926  Bendixen
2,965,678 A   12/1960  Sundberg et al.
(Continued)

FOREIGN PATENT DOCUMENTS

CA    1201128 A1    2/1986
CA    2 536 276     3/2005
(Continued)

OTHER PUBLICATIONS

Benjaram M. Reddy, Pankaj Bharali, Yeong-Hui Seo, Eko Adi Prasetyanto, Sang-Eon Park, Surfactant Controlled and Microwave-Assisted Synthesis of Highly Acitve CexZr1-xO2 Nano-Oxides for CO Oxidation, 2008, Catal Lett, 126, 125-133.*
(Continued)

*Primary Examiner* — Ellen M McAvoy
*Assistant Examiner* — Ming Cheung Po
(74) *Attorney, Agent, or Firm* — RatnerPrestia

(57) ABSTRACT

A process for making cerium dioxide nanoparticles containing at least one transition metal (M) utilizes a suspension of cerium hydroxide nanoparticles prepared by mechanical shearing of an aqueous mixture containing an oxidant in an amount effective to enable oxidation of cerous ion to ceric ion, thereby forming a product stream that contains transition metal-containing cerium dioxide nanoparticles,
(Continued)

TABLE 1

| d, Ang expt. E.D. | Cubic CeO2 | Percent Difference | Diffraction | Cubic Ce2O3 | Percent Difference | Diffraction | Hexagonal Ce2O3 | Percent Difference |
|---|---|---|---|---|---|---|---|---|
| 3.2066 | 3.1234 | 2.67 | 111 | 4.539 | 29.35 | 211 | 3.37 | 4.85 |
| 2.8795 | 2.7056 | 6.43 | 200 | 2.623 | 9.78 | 411 | 3.03 | 4.97 |
| 1.9655 | 1.9134 | 2.72 | 220 | 2.374 | 17.21 | 332 | 2.945 | 33.26 |
| 1.6694 | 1.6318 | 2.31 | 311 | 2.184 | 23.56 | 510 | 2.254 | 25.93 |
| 1.3807 | 1.5622 | 11.61 | 222 | 1.806 | 23.55 | 611 | 1.945 | 29.01 |
| 1.2365 | 1.3531 | 8.61 | 400 | 1.717 | 27.98 | 541 | 1.733 | 28.65 |
| 1.1134 | 1.2415 | 10.31 | 331 | | | | 1.685 | 33.92 |

$Ce_{1-x}M_xO_2$, wherein "x" has a value from about 0.3 to about 0.8. The nanoparticles thus obtained have a cubic fluorite structure, a mean hydrodynamic diameter in the range of about 1 nm to about 10 nm, and a geometric diameter of less than about 4 nm. The transition metal-containing crystalline cerium dioxide nanoparticles can be used to prepare a dispersion of the particles in a nonpolar medium.

8 Claims, 14 Drawing Sheets

Related U.S. Application Data on Apr. 11, 2007, provisional application No. 60/938,314, filed on May 16, 2007.

(51) Int. Cl.

| | | |
|---|---|---|
| C10M 103/06 | (2006.01) | |
| C10M 177/00 | (2006.01) | |
| B01J 37/03 | (2006.01) | |
| B01J 23/10 | (2006.01) | |
| B01J 23/83 | (2006.01) | |
| B01J 35/00 | (2006.01) | |
| B82Y 30/00 | (2011.01) | |

(52) U.S. Cl.
CPC ............ *B01J 35/00* (2013.01); *B01J 35/006* (2013.01); *B01J 35/0013* (2013.01); *B01J 37/031* (2013.01); *B82Y 30/00* (2013.01); *C10M 103/06* (2013.01); *C10M 177/00* (2013.01); *B01J 2523/00* (2013.01); *C10L 2200/0245* (2013.01); *C10N 2210/03* (2013.01)

(58) Field of Classification Search
USPC .......................................................... 44/457
See application file for complete search history.

(56) References Cited

U.S. PATENT DOCUMENTS

| | | |
|---|---|---|
| 2,965,994 A | 12/1960 | Sullivan |
| 3,002,826 A | 10/1961 | Norris |
| 3,951,934 A | 4/1976 | Ohshima et al. |
| 3,964,994 A | 6/1976 | Kelly |
| 4,061,473 A | 12/1977 | Norris |
| 4,231,893 A | 11/1980 | Woodhead |
| 4,294,586 A | 10/1981 | Cox |
| 4,359,969 A | 11/1982 | Mellovist et al. |
| 4,389,220 A | 6/1983 | Kracklauer |
| 4,545,923 A | 10/1985 | Gradeff |
| 4,599,201 A | 7/1986 | Gradeff et al. |
| 4,661,321 A | 4/1987 | Byrd et al. |
| 4,744,796 A | 5/1988 | Hazbun et al. |
| 4,774,796 A | 10/1988 | Aiuola |
| 4,786,325 A | 11/1988 | Melard et al. |
| 5,004,478 A | 4/1991 | Vogel et al. |
| 5,017,352 A | 5/1991 | Chane-Ching et al. |
| 5,097,090 A | 3/1992 | Beck |
| 5,105,772 A | 4/1992 | Olsson et al. |
| 5,248,744 A | 9/1993 | Cramm et al. |
| 5,344,588 A | 9/1994 | Chane-Ching |
| 5,385,648 A | 1/1995 | Sugishima et al. |
| 5,389,352 A | 2/1995 | Wang |
| 5,405,417 A | 4/1995 | Cunningham |
| 5,449,387 A | 9/1995 | Hawkins et al. |
| 5,520,710 A | 5/1996 | Olah |
| 5,552,133 A | 9/1996 | Lambert et al. |
| 5,712,218 A | 1/1998 | Chopin et al. |
| 5,759,917 A | 6/1998 | Grover |
| 5,906,664 A | 5/1999 | Basu et al. |
| 5,910,466 A | 6/1999 | Yamashita et al. |
| 5,919,727 A | 7/1999 | Brezny |
| 5,938,837 A | 8/1999 | Hanawa et al. |
| 6,093,223 A | 7/2000 | Lemaire et al. |
| 6,133,194 A * | 10/2000 | Cuif ..................... B01D 53/945 502/162 |
| 6,136,048 A | 10/2000 | Birchem et al. |
| 6,158,397 A | 12/2000 | Peters et al. |
| 6,210,451 B1 | 4/2001 | Chopin et al. |
| 6,271,269 B1 | 8/2001 | Chane-Ching et al. |
| 6,305,626 B1 | 10/2001 | Korstvedt |
| 6,362,314 B2 | 3/2002 | Akkara et al. |
| 6,368,366 B1 | 4/2002 | Langer et al. |
| 6,382,314 B1 | 5/2002 | Doll et al. |
| 6,383,237 B1 | 5/2002 | Langer et al. |
| 6,391,995 B2 | 5/2002 | Murugan et al. |
| 6,413,489 B1 | 7/2002 | Ying et al. |
| 6,422,736 B1 | 7/2002 | Antoniades et al. |
| 6,509,319 B1 | 1/2003 | Raad et al. |
| 6,627,720 B2 | 9/2003 | Campbell et al. |
| 6,634,576 B2 | 10/2003 | Verhoff et al. |
| 6,645,262 B1 | 11/2003 | Sanduja et al. |
| 6,649,156 B1 * | 11/2003 | Chane-Ching ........... A61K 8/19 106/14.44 |
| 6,723,138 B2 | 4/2004 | Nickel et al. |
| 6,725,653 B2 | 4/2004 | Brown et al. |
| 6,745,961 B2 | 6/2004 | Korstvedt |
| 6,752,979 B1 | 6/2004 | Talbot et al. |
| 6,869,584 B2 | 3/2005 | Ying et al. |
| 6,892,531 B2 | 5/2005 | Rim |
| 6,897,270 B2 | 5/2005 | Ozawa et al. |
| 6,962,681 B2 | 11/2005 | Maganas et al. |
| 7,008,965 B2 | 3/2006 | Chane-Ching |
| 7,025,943 B2 | 4/2006 | Zhou et al. |
| 7,063,729 B2 | 6/2006 | Valentine et al. |
| 7,169,196 B2 | 1/2007 | Wakefield |
| 7,189,768 B2 | 3/2007 | Baran, Jr. |
| 7,195,653 B2 | 3/2007 | Hazarika et al. |
| 7,232,556 B2 | 6/2007 | Yadav |
| 7,384,888 B2 | 6/2008 | Kuno |
| 7,419,516 B1 | 9/2008 | Seal et al. |
| 7,473,408 B2 | 1/2009 | Noh |
| 7,683,098 B2 | 3/2010 | Yadav |
| 7,709,411 B2 | 5/2010 | Zhou et al. |
| 7,803,201 B2 | 9/2010 | Zhou et al. |
| 7,914,617 B2 | 3/2011 | Yadav |
| 7,939,040 B2 * | 5/2011 | Larcher .................. C01G 25/00 423/213.2 |
| 8,076,846 B2 | 12/2011 | Mizuno |
| 8,679,344 B2 | 3/2014 | Allston |
| 9,340,738 B2 * | 5/2016 | DiFrancesco ........ B01J 13/0034 |
| 2002/0095859 A1 | 7/2002 | Hicks et al. |
| 2002/0110519 A1 | 8/2002 | Ying et al. |
| 2002/0177311 A1 | 11/2002 | Schumacher et al. |
| 2003/0148235 A1 | 8/2003 | Valentine et al. |
| 2003/0154646 A1 | 8/2003 | Hazarika et al. |
| 2003/0162843 A1 | 8/2003 | Chane-Ching |
| 2003/0182846 A1 | 10/2003 | Nelson et al. |
| 2003/0182848 A1 | 10/2003 | Collier et al. |
| 2003/0215378 A1 | 11/2003 | Zhou et al. |
| 2003/0221362 A1 | 12/2003 | Collier et al. |
| 2004/0029978 A1 | 2/2004 | Chane-Ching |
| 2004/0035045 A1 | 2/2004 | Caprotti et al. |
| 2004/0137239 A1 | 7/2004 | Klos |
| 2004/0241070 A1 | 12/2004 | Noh et al. |
| 2005/0005506 A1 | 1/2005 | Henly |
| 2005/0031517 A1 | 2/2005 | Chan |
| 2005/0044778 A1 | 3/2005 | Orr |
| 2005/0060929 A1 | 3/2005 | Caprotti et al. |
| 2005/0066571 A1 | 3/2005 | Wakefield |
| 2005/0152832 A1 | 7/2005 | Ying et al. |
| 2005/0165139 A1 * | 7/2005 | Kawakami et al. ............ 524/17 |
| 2005/0227864 A1 | 10/2005 | Sutorik et al. |
| 2006/0000140 A1 | 1/2006 | Caprotti et al. |
| 2006/0005465 A1 | 1/2006 | Blanchard et al. |
| 2006/0027484 A1 | 2/2006 | Leck et al. |
| 2006/0057048 A1 | 3/2006 | Chan et al. |
| 2006/0083694 A1 | 4/2006 | Kodas et al. |
| 2006/0185644 A1 | 8/2006 | Hashimoto et al. |
| 2006/0254130 A1 | 11/2006 | Scattergood |
| 2007/0056601 A1 | 3/2007 | Pillai |

(56) References Cited

U.S. PATENT DOCUMENTS

| | | |
|---|---|---|
| 2007/0224092 A1 | 9/2007 | Miyairi et al. |
| 2008/0009410 A1 | 1/2008 | Okamoto et al. |
| 2008/0161213 A1 | 7/2008 | Jao et al. |
| 2009/0011930 A1* | 1/2009 | Hagemeyer ............ B01J 23/002 502/182 |
| 2009/0215614 A1 | 8/2009 | Chane-Ching |
| 2009/0298684 A1 | 12/2009 | Zhou |
| 2010/0088949 A1 | 4/2010 | Reed |
| 2010/0111789 A1 | 5/2010 | Fajardie |
| 2010/0135937 A1 | 6/2010 | O'Brien et al. |
| 2010/0152077 A1 | 6/2010 | Allston et al. |
| 2010/0199547 A1 | 8/2010 | Reed |
| 2010/0242342 A1 | 9/2010 | Reed et al. |
| 2011/0056123 A1 | 3/2011 | DiFrancesco et al. |
| 2012/0124899 A1 | 5/2012 | DiFrancesco et al. |

FOREIGN PATENT DOCUMENTS

| | | | | |
|---|---|---|---|---|
| CA | 2606198 | | 4/2006 | |
| CA | 2839886 A1 | | 3/2008 | |
| CN | 101113010 | | 1/2008 | |
| EP | 0 208 580 A1 | | 1/1987 | |
| EP | 0 475 620 A2 | | 3/1992 | |
| EP | 1842591 A1 | | 10/2007 | |
| FR | 2 789 601 A1 | | 8/2000 | |
| FR | 2 885 308 A1 | | 11/2006 | |
| FR | 2885308 A1 | * | 11/2006 | ............ B01F 17/0021 |
| FR | 2885308 A1 | * | 11/2006 | ............ B01F 17/0021 |
| GB | 242020 | | 11/1925 | |
| GB | 360171 | | 11/1931 | |
| JP | S59-001439 A | | 1/1984 | |
| JP | S59-045925 A | | 3/1984 | |
| JP | 05155616 | | 6/1993 | |
| JP | 07309624 | | 11/1995 | |
| JP | H08-509002 A | | 9/1996 | |
| JP | H11-501609 A | | 2/1999 | |
| JP | 2001504078 | | 3/2001 | |
| JP | 2001-507739 A | | 6/2001 | |
| JP | 2002-537308 A | | 11/2002 | |
| JP | 2002326812 | | 11/2002 | |
| JP | 2003-520748 A | | 7/2003 | |
| JP | 2004-502022 A | | 1/2004 | |
| JP | 2004-507343 A | | 3/2004 | |
| JP | 2005-508442 A | | 3/2005 | |
| JP | 2005139029 | | 6/2005 | |
| JP | 2006-040556 A | | 2/2006 | |
| JP | 2006-506524 A | | 2/2006 | |
| JP | 2006182604 | | 7/2006 | |
| JP | 2007-051057 A | | 3/2007 | |
| JP | 2007-512412 A | | 5/2007 | |
| JP | 2007-283289 A | | 11/2007 | |
| JP | 2001-524918 A | | 10/2008 | |
| JP | 2008-538349 A | | 10/2008 | |
| JP | 2008-273781 A | | 11/2008 | |
| RU | 2252913 | | 5/2005 | |
| WO | WO 98/18884 A2 | | 5/1998 | |
| WO | WO 1998/045212 A1 | | 10/1998 | |
| WO | WO 02/00812 A2 | | 1/2002 | |
| WO | WO 02/46336 A2 | | 6/2002 | |
| WO | WO 2002/090260 A1 | | 11/2002 | |
| WO | WO 2004/065529 A1 | | 8/2004 | |
| WO | WO 2004/104141 A2 | | 12/2004 | |
| WO | WO 2005/012465 A1 | | 2/2005 | |
| WO | WO 2005/023728 A2 | | 3/2005 | |
| WO | WO 2005023728 A2 | * | 3/2005 | ............ C01G 25/00 |
| WO | WO-2005023728 A2 | * | 3/2005 | ............ C01G 25/00 |
| WO | WO 2008/002323 A2 | | 1/2008 | |
| WO | 2008025753 | | 3/2008 | |
| WO | WO 2008/030815 A2 | | 3/2008 | |

OTHER PUBLICATIONS

Benjara, M. Reddy, Pankaj Bharali, Yeong-Hui Seo, Eko Adi Prasetyanto, Sang-Eon Park, Surfactant Controlled and Microwave-Assisted Synthesis of Highly Active CezZr1-xO2 Nano-Oxies for CO Oxidation, 2008, Catal Lett, 126, 125-133.*

Benjara, M. Reddy, Pankay Bharali, Yeon-Hui Seo, Eko Adi Prasetyanto, Sang-Eon Park, Surfactant Controlled and Microwave-Assisted Synthesis of Highly Active CezZr1-xO2 Nano-Oxides for CO Oxidation, 2008, Catal Lett, 126, 125-133.*

Benjara, M. Reddy, Pankay Bharali, Yeon-Hui Seo, Eko Adi Prasetyanto, Sang-Eon Park, Surfactant Controlled and Microwave-Assisted Synthesis of Highly Active CezZrl-xO2 Nano-Oxides for CO Oxidation, 2008, Catal Lett, 126, 125-133.*

Machine Translation of WO 2005023728 A2.*

MAchine Translation of FR2885308A1.*

Benjara, M. Reddy, Pankay Bharali, Yeon-Hui Seo, Eko Adi Prasetyanto, Sang-Eon Park, Surfactant Controlled and Microwave-Assisted Synthesis of Highly Active CezZrl-xO2 Nano-Oxides for CO Oxidation, 2008, Catal Lett, 126, 125-133 (Year: 2008).*

Machine Translation of WO 2005023728 A2 (Year: 2005).*

Machine Translation of FR2885308A1 (Year: 2006).*

Reddy et al., "Surfactant-Controlled and Microwave-Assisted Synthesis of Highly Active $Ce_xZr_{1-x}O_2$ Nano-Oxides for CO Oxidation" Catalysis Letters, (2008), vol. 126, No. 1-2, pp. 125-133.

Notification Concerning Transmittal of International Preliminary Report on Patentability (Forms PCT/IB/326 and PCT/IB/373) and the Written Opinion of the Searching Authority ( Form PCT/ISA/237) issued in the corresponding International Application No. PCT/US2008/087133 dated Jun. 30, 2011.

European Search Report dated Apr. 11, 2013 in corresponding European Application Serial No. 08879024.1.

Examiner's Report dated Mar. 8, 2013 in corresponding Canadian Patent Application, Serial No. 2,662,782.

Feng, "Preparation of discrete nanosize ceria powder" Ceramics International, vol. 30, (2004) pp. 997-1002.

Patent Abstracts of Japan Publication No. 05-155616 dated Jun. 22, 1993.

Patent Abstracts of Japan Publication No. 2005-139029 dated Jun. 2, 2005.

Patent Abstracts of Japan Publication No. 2006-040556 dated Feb. 9, 2006.

U.S. Appl. No. 12/440,182, Kenneth J. Reed, filed Sep. 4, 2009 (cited herein as US Patent Application Publication No. 2010/0199547 A1 of Aug 12, 2010).

U.S. Appl. No. 12/440,171, Kenneth J. Reed, filed Sep. 4, 2009 (cited herein as US Patent Application Publication No. 2010/0088949 A1 of Apr. 15, 2010).

U.S. Appl. No. 12/440,165, Albert Gary DiFrancesco, Richard K. Hailstone, Andreas Langner and Kenneth J. Reed, filed Sep. 7, 2010 (cited herein as US Patent Application Publication No. 2011/0056123 A1 of Mar. 10, 2011).

U.S. Appl. No. 12/779,602, Kenneth J. Reed, Albert Gary DiFrancesco, Gary Robert Prok and Richard Kenneth Hailstone, filed May 13, 2010 (cited herein as US Patent Application Publication No. 2010/0242342 A1 of Sep. 30, 2010).

U.S. Appl. No. 61/311,416, Reed et al.

U.S. Appl. No. 12/549,776, Alston et al.

Reed, Kenneth J., et al., U.S. Appl. No. 61/311,416, entitled "Structured Catalytic Nanoparticles and Method of Preparation," filed Mar. 8, 2010.

Alston, Thomas D., et al., U.S. Appl. No. 12/549,776, entitled "Process for Solvent Shifting a Nanoparticle Dispersion," filed Aug. 28, 2009.

International Search Report for PCT/US2007/77535, issued by the ISA/US, dated Jan. 29, 2008.

Written Opinion of the ISA for PCT/US2007/77535, issued by the ISA/US, dated Jan. 29, 2008.

International Preliminary Examination Report for PCT/US2007/77535, issued by the IPEA/US, completed Oct. 22, 2008.

International Search Report for PCT/US2007/77543, issued by the ISA/US, dated Jan. 29, 2008.

Written Opinion of the ISA for PCT/US2007/77543, issued by the ISA/US, dated Jan. 29, 2008.

International Search Report for PCT/US2007/77545, issued by the ISA/US, dated Oct. 30, 2008.

(56) References Cited

OTHER PUBLICATIONS

Written Opinion of the ISA for PCT/US2007/77545, issued by the ISA/US, dated Oct. 30, 2008.
Notification of Transmittal of the International Search Report and the Written Opinion of the International Searching Authority (Form PCT/ISA/220), International Search Report (Form PCT/ISA/210) and Written Opinion (Form PCT/ISA/237) issued in the International Application No. PCT/US2011/000429, dated May 5, 2011, 14 pages.
Notification of Transmittal of the International Search Report and the Written Opinion of the International Searching Authority (Form PCT/ISA/220), International Search Report (Form PCT/ISA/210) and Written Opinion (Form PCT/ISA/237) issued in the International Application No. PCT/US2011/000858, dated Oct. 24, 2011.
EP Extended (Supplementary) Search Report issued in EP 07814661. 0-1270 /2074201 PCT/US2007/077543, dated Aug. 16, 2011, EPO, The Hague, NL.
Ep Extended (Supplementary) European Search Report issued in EP 07814656-1270 / 2066767 PCT US2007/077535, Nov. 4, 2011, EPO, The Hague, NL.
Cerium: A Guide to Its Role in Chemical Technology, 1992, cover pg/p. 11, Library of Congress Catalog Card No. 92-93444, USA.
Trovarelli, Alessandro, "Catalysis by Ceria and Related Materials," *Catalytic Science Series*—vol. 2, 2002, cover page/pp. 37-46, Imperial College Press, London, England.
Sathyamurthy, Srivatsan, et al., "Reverse micellar synthesis of cerium oxide nanoparticles," *Nanotechnology*, 2005, pp. 1960-1964, vol. 16, IOP Publishing Ltd., UK.
Patil, S., et al., "Synthesis of nanocrystalline ceria particles for high temperature oxidation resistant coating," *Journal of Nanoparticle Research*, 2002, pp. 433-438, vol. 4, Kluwer Academic Publishers, NL.
Pang, Yong-Xin, et al., "Aluminium oxide nanoparticles prepared by water-in-oil microemulsions," *Journal of Materials Chemistry*, 2002, pp. 3699-3704, vol. 12, The Royal Society of Chemistry, UK.
Zhang, Feng, et al., "Ceria nanoparticles: Size, size distribution, and shape," *Journal of Applied Physics*, Apr. 15, 2004, pp. 4319-4326, vol. 95, No. 8, American Institute of Physics, USA.
Zhang, Feng, et al., "Cerium oxide nanoparticles: Size-selective formation and structure analysis," *Applied Physics Letters*, Jan. 7, 2002, pp. 127-129, vol. 80, No. 1, American Institute of Physics, USA.
Tsunekawa, S., et al., "Structural Study of Monosize $CeO_{2-x}$ Nano-Particles," *NanoStructural Materials*, 1999, pp. 141-147, vol. 11, No. 1, Acta Metallurgica Inc., USA.
Born, C., et al., "Reduction of Soot Emission at a DI Diesel Engine by Additional Injection of Hydrogen Peroxide During Combustion," *International Fall Fuels and Lubricants Meeting and Exposition*, San Francisco, California, Oct. 19-22, 1998, SAE Technical Paper Series, No. 982676, PA, USA.
"Evaluation of Human Health Risk from Cerium Added to Diesel Fuel," *HEI Communication 9*, Aug. 2001, 64 pages (entire publication), Health Effects Institute, MA, USA.
"Development of Reference Doses and Reference Concentrations for Lanthanides," Prepared for the Bureau of Land Management National Applied Resource Sciences Center, Nov. 11, 1999, 52 pages (entire publication), Toxicology Excellence for Risk Assessment, USA.
Chen, Junping, et al., "Rare earth nanoparticles prevent retinal degeneration induced by intracellular peroxides," *nature nanotechnology*, Nov. 2006, pp. 142-150, Nature Publishing Group, www.nature.com/naturenanotechnology, http://npg.nature.com/reprintsandpermissions/.
Tarnuzzer, Roy W., et al., "Vacancy Engineered Ceria Nanostructures for Protection from Radiation-Induced Cellular Damage," *Nano Letters*, 2005, pp. 2573-2577, vol. 5, No. 12, American Chemical Society, USA.
"Joint TMC/SAE Fuel Consumption Test Procedure—Type II," SAE.J1321, Oct. 1986, 29 pages, Society of Automotive Engineers, Inc., USA.

Deshpande, Sameer, et al., "Size dependency variation in lattice parameter and valency states in nanocrystalline cerium oxide," *Applied Physics Letters*, 2005, vol. 87, 133113-1, three pages, American Institute of Physics, USA.
Tuller, H.L., et al., "Doped Ceria as a Solid Oxide Electrolyte," *Solid-State Science and Technology*, Feb. 1975, pp. 255-259, vol. 122, No. 2, Journal of the Electrochemical Society, NY, USA.
De Guire, Mark R., et al., "Point defect analysis and microstructural effects in pure and donor-doped ceria," *Solid State Ionics*, 1992, pp. 155-163, vol. 52, Elsevier Science Publishers B.V., NL.
Bera, Parthasarathi, et al., "Studies on $Cu/CeO_2$: A New NO Reduction Catalyst," *Journal of Catalysis*, 1999, pp. 36-44, vol. 186, Academic Press, NY, USA.
Terribile, Daniela, et al., "The preparation of high surface area $CeO_2$—$ZrO_2$ mixed oxides by a surfactant-assisted approach," *Catalysis Today*, 1998, pp. 79-88, vol. 43, Elsevier Science B.V., NL.
Mamontov, E., et al., "Lattice Defects and Oxygen Storage Capacity of Nanocrystalline Ceria and Ceria-Zirconia," *J. Phys. Chem. B*, 2000, pp. 11110-11116, vol. 104, American Chemical Society, USA.
Yang, Zongxian, et al., "Effects of Zr doping on stoichiometric and reduced ceria: a first-principles study," *The Journal of Chemical Physics*, 2006, 224704, 7 pages, vol. 124, American Institute of Physics, USA.
Wang, Ruigang, et al., "Nanoscale Heterogeneity in Ceria Zirconia with Low-Temperature Redox Properties," *J. Phys. Chem. B*, 2006, pp. 18278-18285, vol. 110, American Chemical Society, USA.
Bedrane, Sumeya, et al., "Investigation of the oxygen storage process on ceria- and ceria-zirconia-supported catalysts," *Catalysis Today*, 2002, pp. 401-405, vol. 75, Elsevier Science B.V., NL.
Sarkas, Harry, et al., "Nanocrystalline Mixed Metal Oxides—Novel Oxygen Storage Materials," *NSTI—Nanotech 2004*, 2004, pp. 496-498, vol. 3, CRC Press, USA.
Aneggi, Eleonora, et al., "Promotional effect of rare earths and transition metals in the combustion of diesel soot over $CeO_2$ and $CeO_2$—$ZrO_2$," *Catalysis Today*, 2006, pp. 40-47, vol. 114, Elsevier B.V., NL.
Bera, Parthasarathi, et al., "Structural Investigation of Combustion Synthesized $Cu/CeO_2$ Catalysts by Exafs and Other Physical Techniques: Formation of a $Ce_{1-x}Cu_xO_{2-\delta}$ Solid Solution," *Chem. Mater.*, 2002, pp. 3591-3601, vol. 14, American Chemical Society, USA.
Wang, Xianqin, et al., "Unusual Physical and Chemical Properties of Cu in $Ce_{1-x}Cu_xO_2$ Oxide," *J. Phys. Chem. B*, 2005, pp. 19595-19603, vol. 109, American Chemical Society, USA.
Perez-Alonso, F.J., "Synergy of $Fe_xCe_{1-x}O_2$ mixed oxides for $N_2O$ decomposition," *Journal of Catalysis*, 2006, pp. 340-346, vol. 239, Elsevier Inc., USA.
Ruisheng, Hu, et al., "Solid-Phase Synthesis of Ce—O, Fe—Ce—O Catalysts and Their Catalytic Activities in Methane Combustion," *Petrochemical Technology*, 2006, pp. 319-323, vol. 35, Issue 4, kong zhi li lun yu ying yong bian ji bu, CN.
Norris, David J., et al., "Doped Nancrystals," *Science*, Mar. 28, 2008, pp. 1776-1779, vol. 319, www.sciencemag.org.
Leubner, Ingo H., "Particle nucleation and growth models," *Current Opinion in Colloid & Interface Science*, 2000, pp. 151-159, vol. 5, Elsevier Science Ltd., USA.
Leubner, Ingo H., "A Balanced Nucleation and Growth Model for Controlled Precipitations," *J. Dispersion Science and Technology*, 2001, pp. 125-138, vol. 22, No. 1, Marcel Dekker, Inc., www.dekker.com.
Leubner, Ingo H., "Balanced Nucleation and Growth Model for Controlled Crystal Size Distribution," *Journal of Dispersion Science and Technology*, 2002, pp. 577-590, vol. 23, No. 4, Marcel Dekker, Inc., www.dekker.com.
Griffith, W.L., et al., Correlating Microemulsion Fuel Composition, Structure, and Combustion Properties, *Oak Ridge National Laboratory document* TM-11248, Jan. 1, 1989, 45 pages, Oak Ridge, TN, US.
Canadian Office Action for corresponding Canadian Pat. App. No. CA 2,662,769, dated Jul. 17, 2013.
Canadian Office Action for corresponding Canadian Pat. App. No. CA 2,662,782 dated Mar. 8, 2013.
Canadian Office Action for corresponding Canadian Pat. App. No. CA 2,662,782 dated Nov. 25, 2013.

(56) References Cited

OTHER PUBLICATIONS

Indian Office Action for corresponding Indian Pat. App. No. IN 1203/KOLNP/2009 dated Jan. 21, 2014.
Japanese Office Action for corresponding Japanese Pat. App. No. JP 2009-527516, dated Dec. 25, 2012.
Japanese Office Action for corresponding Japanese Pat. App. No. JP 2009-527516, dated Jul. 23, 2013.
Japanese Office Action for corresponding Japanese Pat. App. No. JP 2011-542092, dated Jul. 24, 2013.
Mexican Office Action of Mexican Application No. MX/a/2011/006461, dated Dec. 3, 2014.
Australian Patent Examination No. 1 for corresponding Australian Pat. App. No. 2011253488, dated Dec. 2, 2013.
Canadian Office Action for corresponding Canadian Pat. App. No. CA 2,662,765, dated Dec. 17, 2013.
Chinese Office Action dated Feb. 6, 2013 for Chinese Application No. 200880132663.1.
Chinese Office Action dated Mar. 20, 2014 for Chinese Application No. 200880132663.1.
Chinese Office Action dated Sep. 10, 2013 for Chinese Application No. 200880132663.1.
Entire patent prosecution history of U.S. Appl. No. 12/440,165, filed Sep. 7, 2010, entitled, "Method of Preparing Cerium Dioxide Nanoparticles."
Entire patent prosecution history of U.S. Appl. No. 12/440,171, filed Sep. 4, 2009, entitled, "Method of Conditioning an Internal Combustion Engine."
Entire patent prosecution history of U.S. Appl. No. 12/440,182, filed Sep. 4, 2009, entitled, "Cerium Dioxide Nanoparticle-Containing Fuel Additive."
Entire patent prosecution history of U.S. Appl. No. 12/549,776 filed Aug. 28, 2009, entitled, "Process for Solvent Shifting a Nanoparticle Dispersion," now U.S. Pat. No. 8,679,344, dated Mar. 25, 2014.
Entire patent prosecution history of U.S. Appl. No. 12/779,602, filed May 13, 2010, entitled, "Cerium-Containing Nanoparticles," now U.S. Pat. No. 8,883,865, issued Nov. 11, 2014.
Entire patent prosecution history of U.S. Appl. No. 13/444,129, filed Apr. 11, 2012, entitled, "Method of Conditioning an Internal Combustion Engine."
Entire patent prosecution history of U.S. Appl. No. 13/662,511, filed Oct. 28, 2012, entitled, "Cerium Dioxide Nanoparticle-Containing Fuel Additive."
Entire patent prosecution history of U.S. Appl. No. 13/865,858, filed Apr. 18, 2013, entitled, "Method of Conditioning an Internal Combustion Engine."
Entire patent prosecution history of U.S. Appl. No. 14/537,161, filed Nov. 10, 2014, entitled, "Cerium-Containing Nanoparticles."
Entire patent prosecution history of U.S. Appl. No. 14/537,993, filed Nov. 11, 2014, entitled, "Cerium Oxide Containing Nanoparticles."
European Search Report dated Jan. 20, 2012 in European Application No. 07814663.6.
G. Dalwadi, H. Benson, and Y. Chen, "Comparison of Diafiltration and Tangential Flow Filtration for Purification of Nanoparticle Suspensions," Pharmaceutical Research 22 (2005) 2154-2162.
I. Limayem, C. Charcosset, and H. Fessi, "Purification of Nanoparticle Suspensions by a Concentration/Diafiltration Process," Separation and Purification Technology 38 (2004) 1-9.
Japanese Office Action translation for Japanese Application No. 2011-542092.
Japanese Translation of Decision of Grant dated Nov. 19, 2013 in Japanese Application No. 2009-527516.
Mexican Office Action (English Translation only) for corresponding Mexican Pat. App. No. MX/a/2011/006461, dated Jun. 3, 2014.

Office Action of corresponding U.S. Appl. No. 13/865,858, dated Sep. 5, 2014.
Office Action of Corresponding U.S. Appl. No. 12/440,165, dated Oct. 6, 2014.
Russian Decision of Grant dated Feb. 15, 2013 in Russian Application No. 2011129305/04(043303).
S. Sweeney, G. Woehrle, and J. Hutchison, "Rapid Purification and Size Separation of Gold Nanoparticles via Diafiltration," J. Am. Chem. Soc. (2006) 128, 3190-3197.
Swanand D. Patil, "Fundamental Aspects of Regenerative Cerium Oxide Nanoparticles and their Applications in Nanobiotechnology," pHD dissertation presented at the University of Central Florida, Summer Term 2006, downloaded from Google Advanced Scholar Search, Jan. 31, 2012.
Japanese Office Action for corresponding Japanese Patent Application No. 2014-006333 dated Feb. 17, 2015.
Chinese Notification of Reexamination dated Dec. 11, 2015 for Chinese Application No. 200880132663.1 with English translation.
Canadian Office Action dated May 21, 2015 in Canadian Application No. 2,839,886.
European Office Action dated Jun. 12, 2015 in European Application No. 0781463.6.
European Search Report dated Jun. 25, 2015 in European Application No. 15157868.9.
Ingegard Johansson, Martin Svensson, "Surfactants based on fatty acids and other natural hydrophobes," 2001, Colloid and Interface Science, vol. 6, pp. 178-188.
Korean Office Action dated Apr. 29, 2015 in Korean Application No. 10-2011-7016496, including English translation.
Office Action dated Jun. 5, 2015 in U.S. Appl. No. 12/440,165.
Notice of Allowance dated Aug. 14, 2015 in U.S. Appl. No. 13/865,858.
Office Action dated Jul. 22, 2015 in U.S. Appl. No. 14/537,993.
Office Action dated Jul. 22, 2015 in U.S. Appl. No. 14/537,161.
Japanese Office Action dated Jul. 15, 2015 for Japanese Application No. 2013-258488, including English translation.
Notice of Allowance dated Nov. 24, 2015 in U.S. Appl. No. 14/537,993.
Canadian Office Action dated Mar. 26, 2015 in Canadian Application No. 2,747,547.
Final Office Action for U.S. Appl. No. 12/440,165, dated Jul. 1, 2016, 20 pages.
Canadian Examiner's Report dated Feb. 1, 2016 for Canadian Application No. 2,839,886.
Notice of Allowance dated Jan. 20, 2016 for U.S. Appl. No. 14/537,161.
Non Final Office Action dated Jan. 15, 2016 for U.S. Appl. No. 12/440,165.
Canadian Office Action dated Jan. 4, 2016 for Canadian Application No. 2,747,547.
Indian First Examination Report for Application No. 5450/DELNP/2011, dated Jun. 20, 2017, 6 pages.
Canadian Office Action/Examination Report for Application No. 2798986, dated Jun. 30, 2017, 4 pages.
U.S. Non-Final Office Action for U.S. Appl. No. 12/440,165, dated May 11, 2017, 11 pages.
Canadian Office Action/Examination Report for Canadian Application No. 2,798,986, dated Mar. 20, 2018, 5 pages.
Notice of Allowance for U.S. Appl. No. 12/440,165, dated Jan. 30, 2018, 26 pages.
Australian Office Action of Corresponding Australian Patent Application No. 2008365234, dated Jul. 10, 2014.
Mexican Office Action of Corresponding Mexican Application No. MX/a/2011/006461, dated May 2, 2014.

\* cited by examiner

Non-isothermally precipitated CeO$_2$ Nanoparticles

X-Ray Diffraction

~ 1.1 nm CeO$_2$ Nanoparticles

FIG. 3C

TABLE 1

| d, Ang expt. E.D. | Cubic CeO2 | Percent Difference | Diffraction | Cubic Ce2O3 | Percent Difference | Diffraction | Hexagonal Ce2O3 | Percent Difference |
|---|---|---|---|---|---|---|---|---|
| 3.2066 | 3.1234 | 2.67 | 111 | 4.539 | 29.35 | 211 | 3.37 | 4.85 |
| 2.8795 | 2.7056 | 6.43 | 200 | 2.623 | 9.78 | 411 | 3.03 | 4.97 |
| 1.9655 | 1.9134 | 2.72 | 220 | 2.374 | 17.21 | 332 | 2.945 | 33.26 |
| 1.6694 | 1.6318 | 2.31 | 311 | 2.184 | 23.56 | 510 | 2.254 | 25.93 |
| 1.3807 | 1.5622 | 11.61 | 222 | 1.806 | 23.55 | 611 | 1.945 | 29.01 |
| 1.2365 | 1.3531 | 8.61 | 400 | 1.717 | 27.98 | 541 | 1.733 | 28.65 |
| 1.1134 | 1.2415 | 10.31 | 331 | | | | 1.685 | 33.92 |

Isothermally Precipitated Nanoparticles

Cu-Containing CeO₂ Nanoparticles

Fe-Containing CeO$_2$ Nanoparticles Ce$_{0.9}$Fe$_{0.10}$O$_{1.95}$
Fig. 6A TEM
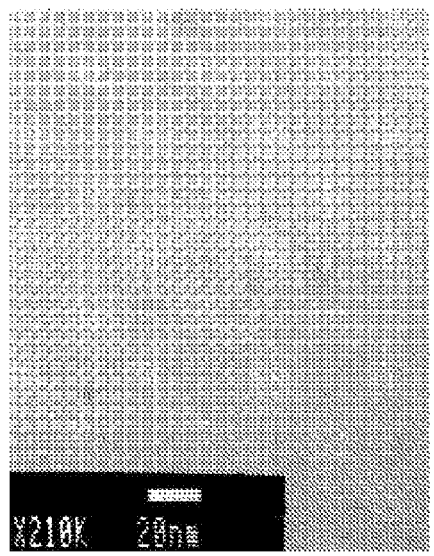
Fig. 6B Size Frequency Distribution
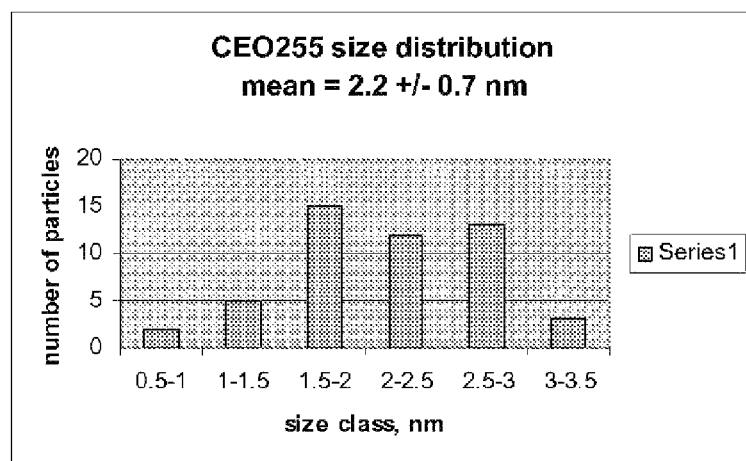

Zr-Containing CeO₂ Nanoparticles

Zr and Fe-Containing CeO$_2$ Nanoparticles
Fig. 8A TEM
Fig. 8B Size Frequency Distribution
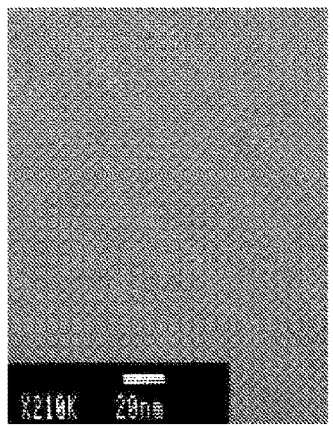
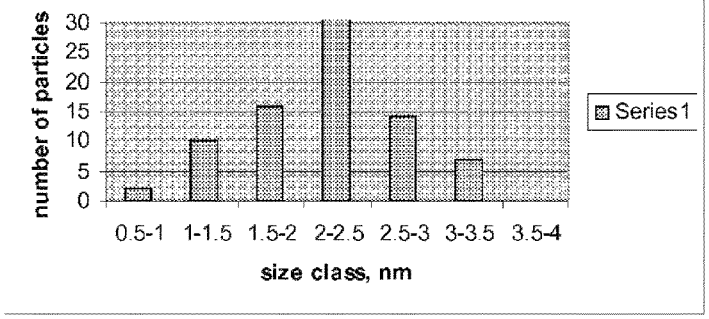

FIG. 8C XRD CeO$_2$ (lower) and Ce$_{0.70}$Fe$_{0.15}$Zr$_{0.15}$O$_2$ (upper)
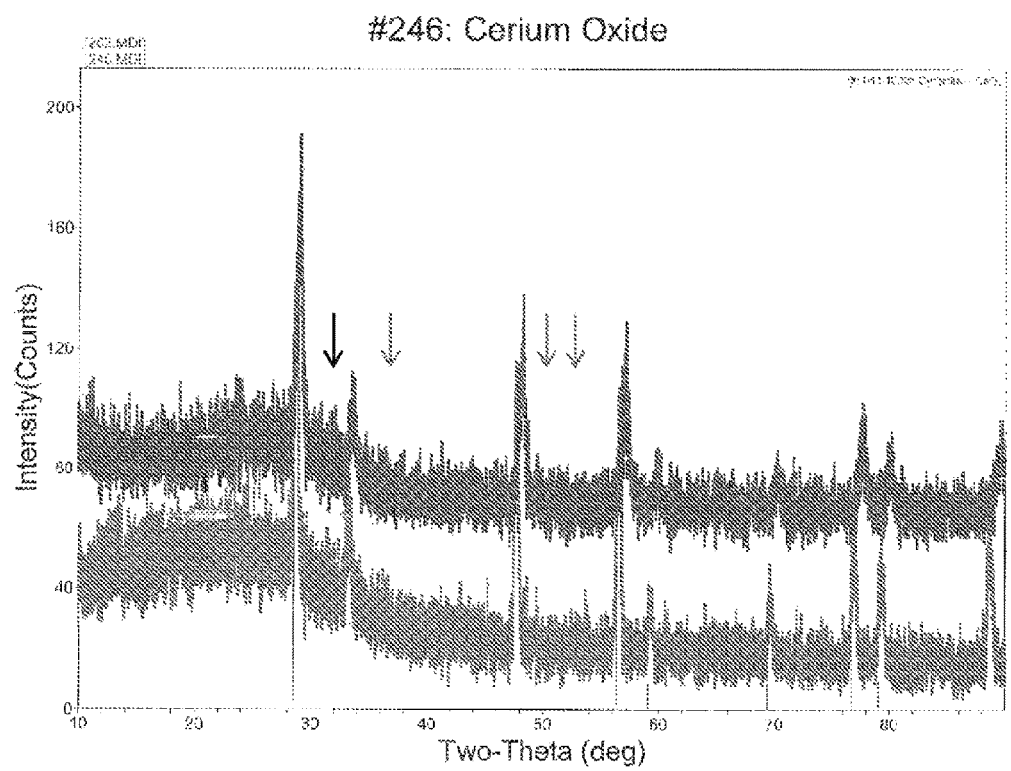

Field Emission Gun TEM Lattice Image
of $CeO_2$ Nanoparticles

FUEL ADDITIVE CONTAINING LATTICE ENGINEERED CERIUM DIOXIDE NANOPARTICLES

CROSS-REFERENCE TO RELATED APPLICATIONS

This application is related to: PCT/US07/077545, METHOD OF PREPARING CERIUM DIOXIDE NANOPARTICLES, and PCT/US07/077,535, CERIUM DIOXIDE NANOPARTICLE-CONTAINING FUEL ADDITIVE, both filed Sep. 4, 2007; which applications claim the benefit of priority from: Provisional Application Ser. No. 60/824,514, CERIUM-CONTAINING FUEL ADDITIVE, filed Sep. 5, 2006; Provisional Application Ser. No. 60/911,159, REVERSE MICELLAR FUEL ADDITIVE COMPOSITION, filed Apr. 11, 2007; and Provisional Application Ser. No. 60/938,314, REVERSE MICELLAR FUEL ADDITIVE COMPOSITION, filed May 16, 2007. The disclosures of all of these applications are incorporated herein by reference.

FIELD OF THE INVENTION

The present invention relates in general to cerium dioxide nanoparticles and, in particular, to cerium dioxide nanoparticles, $Ce_{1-x}M_xO_2$, containing one or more transition metals (M), and to a method for preparing such particles. These nanoparticles are useful as components of fuel additive compositions, as a wash coat for catalytic converters, or as a catalyst for a reduction/oxidation reaction

BACKGROUND OF THE INVENTION

The trucking industry accounts for more than 5% of the U.S. GDP and is comprised of more that 500,000 for-hire, private and government fleets, including owner operators. It is a barometer of the US economy representing nearly 70% of the tonnage carried by all modes of domestic freight transportation, including manufactured and retail goods. This industry is powered almost exclusively by diesel engines (compressive ignition engines), which are characterized by high torque developed at low rpm and 25% greater thermodynamic efficiency compared to spark ignition (gasoline) engines. As a result of the 2007 EPA mandated emissions reductions in oxides of nitrogen (NOx) and diesel particulate matter (DPM or soot), diesel-powered vehicles are now required to be fitted with diesel oxidation catalysts (DOC) or some form of catalytic converter and to burn ultra low sulfur diesel fuel, ULSD, (<15 ppm S). These and other technologies such as EGR (emissions gas recirculation) are necessary to meet the EPA mandated emissions standards. The ULSD requirement is a consequence of sulfur poisoning of the precious metals on the DOC by high sulfur levels. This legislation has far ranging consequences, as (on road) diesel fuel in the US is consumed at a prodigious rate, 650M gal/week, which is second only to that of gasoline (1300 M gal/wk).

It is estimated that the imputed costs of the EPA mandates will add approximately $0.39 to the cost of one gallon of diesel fuel. This is factored into the following components: increased engine costs ($0.11/gal), particle trap maintenance ($0.05/gal), reduced fuel economy ($0.09/gal), increase in ULSD ($0.06/gal), and lower ULSD fuel energy content ($0.08/gal).

Clearly any technology that could provide a reduction in DPM and other emissions, simultaneously with an increase in fuel economy (as measured by an increase in miles-per-gallon) would be perceived as a tremendous financial and environmental benefit.

Diesel fuel additives, in particular, those that include to inorganic metal and metal oxide materials as opposed to organic materials, offer the promise of reduced DPM and improved fuel economy.

Kracklaurer, U.S. Pat. No. 4,389,220, the disclosure of which is incorporated herein by reference, describes a method of conditioning diesel engines in which a diesel engine is operated on a diesel fuel containing from about 20-30 ppm of dicyclopentadienyl iron for a period of time sufficient to eliminate carbon deposits from the combustion surfaces of the engine and to deposit a layer of iron oxide on the combustion surfaces, which layer is effective to prevent further buildup of carbon deposits. Subsequently, the diesel engine is operated on a maintenance concentration of from about 10-15 ppm of dicyclopentadienyl iron or an equivalent amount of a derivative thereof on a continuous basis. The maintenance concentration is effective to maintain the catalytic iron oxide layer on the combustion surfaces but insufficient to decrease timing delay in the engine. The added dicyclopentadienyl iron may produce iron oxide on the engine cylinder surface ($Fe_2O_3$), which reacts with carbon deposits (soot) to form Fe and $CO_2$, thereby removing the deposits. However, this method may accelerate the aging of the engine by formation of rust.

Valentine, et al., U.S. Patent Appl. Publ. No. 2003/0148235, the disclosure of which is incorporated herein by reference, describe specific bimetallic or trimetallic fuel-borne catalysts for increasing the fuel combustion efficiency. The catalysts reduce fouling of heat transfer surfaces by unburned carbon while limiting the amount of secondary additive ash, which may itself cause overloading of particulate collector devices or emissions of toxic ultra fine particles when used in forms and quantities typically employed. By utilizing a fuel containing a fuel-soluble catalyst comprised of platinum and at least one additional metal comprising cerium and/or iron, production of pollutants of the type generated by incomplete combustion is reduced. Ultra low levels of nontoxic metal combustion catalysts can be employed for improved heat recovery and lower emissions of regulated pollutants. However, fuel additives of this type, in addition to using the rare and expensive metals such as platinum, can require several months before the engine is "conditioned". By "conditioned" is meant that all the benefits of the additive are not obtained until the engine has been operated with the catalyst for a period of tune. Initial conditioning may require 45 days and optimal benefits may not be obtained until 60-90 days. Additionally, free metal may be discharged from the exhaust system into the atmosphere, where it may subsequently react with living organisms.

Cerium dioxide is widely used as a catalyst in converters for the elimination of toxic exhaust emission gases and the reduction in particulate emissions in diesel powered vehicles. Within the catalytic converter, the cerium dioxide can act as a chemically active component, acting to release oxygen in the presence of reductive gases, as well as to remove oxygen by interaction with oxidizing species.

Cerium dioxide may store and release oxygen by the reversible process shown in equation 1.

$$CeO_2 \leftrightarrow CeO_{2-x} + x/2 O_2 \qquad (eq.\ 1)$$

This process is referred to as the oxygen storage capability (OSC) of ceria. Here ceria acts as an oxygen storage buffer (much like a pH buffer), releasing oxygen in spatial regions where the oxygen concentration or pressure is low and absorbing oxygen in spatial regions where the oxygen pressure is high. When x=0.5, ceria is effectively fully reduced to $Ce_2O_3$, and the maximum theoretical OSC is 1452 micromoles of $O_2$ per gram of ceria. The redox potential between the $Ce^{3+}$ and $Ce^{4+}$ ions lies between 1.3 and 1.8V and is highly dependent upon the anionic groups present and the chemical environment (CERIUM: A Guide to its Role in Chemical Technology, 1992 by Molycorp, Library of Congress Catalog Card Number 92-93444)). This allows the described forward and backward reactions to easily occur in exhaust gases near the stoichiometric ratio of required oxygen (15:1). Cerium dioxide may provide oxygen for the oxidation of CO or hydrocarbons in an oxygen-starved environment, or conversely may absorb oxygen for reducing the levels of nitrogen oxides (NOx) in an oxygen-rich environment. Similar catalytic activity may also occur when cerium dioxide is added as an additive to fuel, for example, diesel or gasoline. However, for this effect to be useful, the cerium dioxide must be of a particle size small enough, i.e., nanoparticulate (less than 100 nm), to remain suspended by Brownian motion in the fuel and not settle out. In addition, as catalytic effects depend on surface area, the small particle size renders the nanocrystalline material more effective as a catalyst. The incorporation of cerium dioxide in fuel serves not only to act as a catalyst to reduce toxic exhaust gases produced by fuel combustion, for example, by the "water gas shift reaction"

$$CO+H_2O \rightarrow CO_2+H_2,$$

but also to facilitate the burning off of particulates that accumulate in the particulate traps typically used with diesel engines.

As already noted, cerium dioxide nanoparticles are particles having a mean diameter of less than 100 nm. For the purposes of this disclosure, unless otherwise stated, the diameter of a nanoparticle refers to its hydrodynamic diameter, which is the diameter determined by dynamic light scattering technique and includes molecular adsorbates and the accompanying solvation shell of the particle. Alternatively, the geometric particle diameter can be estimated using transmission electron micrography (TEM).

Vehicle on-board dosing systems that dispense cerium dioxide into the fuel before it enters the engine are known, but such systems are complicated and require extensive electronic control to feed the appropriate amount of additive to the fuel. To avoid such complex on-board systems, cerium dioxide nanoparticles can also be added to fuel at an earlier stage to achieve improved fuel efficiency. They can, for example, be incorporated at the refinery, typically along with processing additives such as, for example, cetane improvers or lubricity agents, or added at a fuel distribution tank farm.

Cerium dioxide nanoparticles can also be added at a fuel distribution center by rack injection into large (~100,000 gal) volumes of fuel, or at a smaller fuel company depot, which would allow customization according to specified individual requirements. In addition, the cerium dioxide may be added at a filling station during delivery of fuel to a vehicle, which would have the potential advantage of improved stabilization of the particle dispersion.

Cerium nanoparticles may form a ceramic layer on the engine cylinders and internal moving parts, thereby essentially turning the engine into a catalytic device. Alternatively, they may be recycled in the lubrication oil where they accumulate. Their catalytic efficiency derives from the fact that they provide a source of oxygen atoms during combustion by undergoing reduction according to the equation (1); however, an induction period of several months is usually required before their mpg benefit is observed. This ultimately results in better fuel combustion and reduced levels of particulate material emissions. Additionally, when used as a fuel additive, these nanoparticles may provide improved engine performance by reducing engine friction. As an alternative mode of introduction, cerium dioxide nanoparticles can be added to the lube oil and act as a lubricity enhancing agent to reduce internal friction. This will also improve fuel efficiency.

The following publications, the disclosures all of which are incorporated herein by reference, describe fuel additives containing cerium oxidic compounds.

Hawkins et al., U.S. Pat. No. 5,449,387, discloses a cerium (IV) oxidic compound having the formula:

$$(H_2O)_p[CeO(A)_2(AH)_n]_m$$

in which the radicals A, which are the same or different, are each an anion of an organic oxyacid AH having a $pK_a$ greater than 1, p is an integer ranging from 0 to 5, n is a number ranging from 0 to 2, and m is an integer ranging from 1 to 12. The organic oxyacid is preferably a carboxylic acid, more preferably, a $C_2$-$C_{20}$ monocarboxylic acid or a $C_4$-$C_{12}$ dicarboxylic acid. The cerium-containing compounds can be employed as catalysts for the combustion of hydrocarbon fuels.

Valentine et al., U.S. Pat. No. 7,063,729, discloses a low-emissions diesel fuel that includes a bimetallic, fuel-soluble platinum group metal and cerium catalyst, the cerium being provided as a fuel-soluble hydroxyl oleate propionate complex.

Chopin et al., U.S. Pat. No. 6,210,451, discloses a petroleum-based fuel that includes a stable organic sol that comprises particles of cerium dioxide in the form of agglomerates of crystallites (preferred size 3-4 nm), an amphiphilic acid system containing at least one acid whose total number of carbons is at least 10, and an organic diluent medium. The controlled particle size is no greater than 200 nm.

Birchem et al., U.S. Pat. No. 6,136,048, discloses an adjuvant for diesel engine fuels that includes a sol comprising particles of oxygenated compound having a $d_{90}$ no greater than 20 nm, an amphiphilic acid system, and a diluent. The oxygenated metal compound particles are prepared from the reaction in solution of a rare earth salt such as a cerium salt with a basic medium, followed by recovery of the formed precipitate by atomization or freeze drying.

Lemaire et al., U.S. Pat. No. 6,093,223, discloses a process for producing aggregates of ceric oxide crystallites by burning a hydrocarbon fuel in the presence of at least one cerium compound. The soot contains at least 0.1 wt. % of ceric oxide crystallite aggregates, the largest particle size being 50-10,000 angstroms, the crystallite size being 50-250 angstroms, and the soot having an ignition temperature of less than 400° C.

Hazarika et al., U.S. Pat. No. 7,195,653 B2, discloses a method of improving fuel efficiency and/or reducing fuel emissions of a fuel burning apparatus, the method comprising dispersing at least one particulate lanthanide oxide, particularly cerium dioxide, in the fuel at 1 to 10 ppm, either as a tablet, a capsule a powder or liquid fuel additive wherein the particulate lanthanum oxide is coated with a surfactant selected from the group consisting of alkyl carboxylic anhydrides and esters having an HLB of 7 or less. The preferred coating is dodecyl succinic anhydride.

Collier et al., U.S. Patent Appl. Publ. No. 2003/0182848, discloses a diesel fuel composition that improves the performance of diesel fuel particulate traps and contains a combination of 1-25 ppm of metal in the form of a metal salt additive and 100-500 ppm of an oil-soluble nitrogen-containing ashless detergent additive. The metal may be an alkali metal, an alkaline earth metal, a metal of Group IVB, VIIB, VIIIB, IB, IIB, or any of the rare earth metals having atomic numbers 57-71, especially cerium, or mixtures of any of the foregoing metals.

Collier et al., U.S. Patent Appl. Publ. No. 2003/0221362, discloses a fuel additive composition for a diesel engine equipped with a particulate trap, the composition comprising a hydrocarbon solvent and an oil-soluble metal carboxylate or metal complex derived from a carboxylic acid containing not more than 125 carbon atoms. The metal may be an alkali metal, an alkaline earth metal, a metal of Group IVB, VIIB, VIIIB, IB, IIB, or a rare earth metal, including cerium, or mixtures of any of the foregoing metals.

Caprotti et al., U.S. Patent Appl. Publ. No. 2004/0035045, discloses a fuel additive composition for a diesel engine equipped with a particulate trap. The composition comprises an oil-soluble or oil-dispersible metal salt of an acidic organic compound and a stoichiometric excess of metal. When added to the fuel, the composition provides 1-25 ppm of metal, which is selected from the group consisting of Ca, Fe, Mg, Sr, Ti, Zr, Mn, Zn, and Ce.

Caprotti et al., U.S. Patent Appl. Publ. No. 2005/0060929, discloses a diesel fuel composition stabilized against phase separation that contains a colloidally dispersed or solubilized metal catalyst compound and 5-1000 ppm of a stabilizer that is an organic compound having a lipophilic hydrocarbyl chain attached to at least two polar groups, at least one of which is a carboxylic acid or carboxylate group. The metal catalyst compound comprises one or more organic or inorganic compounds or complexes of Ce, Fe, Ca, Mg, Sr, Na, Mn, Pt, or mixtures thereof.

Caprotti et al., U.S. Patent Appl. Publ. No. 2006/0000140, discloses a fuel additive composition that comprises at least one colloidal metal compound or species and a stabilizer component that is the condensation product of an aldehyde or ketone and a compound comprising one or more aromatic moieties containing a hydroxyl substituent and a further substituent chosen from among hydrocarbyl, —COOR, or —COR, R being hydrogen or hydrocarbyl. The colloidal metal compound preferably comprises at least one metal oxide, preferred oxides being iron oxide, cerium dioxide, or cerium-doped iron oxide.

Scattergood, International Publ. No. WO 2004/065529, discloses a method for improving the fuel efficiency of fuel for an internal combustion engine that comprises adding to the fuel cerium dioxide and/or doped cerium dioxide and, optionally, one or more fuel additives.

Anderson et al., International Publ. No. WO 2005/012465, discloses a method for improving the fuel efficiency of a fuel for an internal combustion engine that comprises lubricating oil and gasoline, the method comprising adding cerium dioxide and/or doped cerium dioxide to the lubricating oil or the gasoline.

Cerium-containing nanoparticles can be prepared by a variety of techniques known in the art. Regardless of whether the synthesized nanoparticles are made in a hydrophilic or hydrophobic medium, the particles normally require a stabilizer to prevent undesirable agglomeration. The following publications, the disclosures all of which are incorporated herein by reference, describe some of these synthetic techniques.

Chane-Ching et al., U.S. Pat. No. 6,271,269, discloses a process for preparing storage-stable organic sols that comprises: reacting a base reactant with an aqueous solution of the salt of an acidic metal cation to form an aqueous colloidal dispersion containing excess hydroxyl ions; contacting the aqueous colloidal dispersion with an organic phase comprising an organic liquid medium and an organic acid; and separating the resulting aqueous/organic phase mixture into an aqueous phase and a product organic phase. Preferred metal cations are cerium and iron cations. The colloidal particulates have hydrodynamic diameters in the range of 5-20 nanometers.

Chane-Ching, U.S. Pat. No. 6,649,156, discloses an organic sol containing cerium dioxide particles that are made by a thermal hydrolysis process; an organic liquid phase; and at least one amphiphilic compounds chosen from polyoxyethylenated alkyl ethers of carboxylic acids, polyoxyethylenated alkyl ether phosphates, dialkyl sulfosuccinates, and quaternary ammonium compounds. The water content of the sols may not be more than 1%. The mean crystallite size is about 5 nm, while the particle agglomerates of these crystallites range in size from 200 to 10 nm.

Chane-Ching, U.S. Pat. No. 7,008,965, discloses an aqueous colloidal dispersion of a compound of cerium and at least one other metal, the dispersion having a conductivity of at most 5 mS/cm and a pH between 5 and 8.

Chane-Ching, U.S. Patent Appl. Publ. No. 2004/0029978 (abandoned Dec. 7, 2005), discloses a surfactant formed from at least one nanoparticle that has amphiphilic characteristics and is based on a metal oxide, hydroxide and/or oxyhydroxide, on the surface of which organic chains with hydrophobic characteristics are bonded. The metal is preferably selected from among cerium, aluminum, titanium or silicon, and the alkyl chain comprises 6-30 carbon atoms, or polyoxyethylene monoalkyl ethers of which the alkyl chain comprises 8-30 carbon atoms and the polyoxyethylene part comprises 1-10 oxyethylene groups. The particle is an isotopic or spherical particle having an average diameter of 2-40 nm.

Blanchard et al., U.S. Patent Appl. Publ. No. 2006/0005465, discloses an organic colloidal dispersion comprising: particles of at least one compound based on at least one rare earth, at least one acid, and at least one diluent, wherein at least 90% of the particles are monocrystalline. Example 1 describes the preparation of a cerium dioxide colloidal solution from cerium acetate and an organic phase that includes Isopar hydrocarbon mixture and isostearic acid. The resulting cerium dioxide particles had a $d_{50}$ of 2.5 nm, and the size of 80% of the particles was in the range of 1-4 nm.

Zhou et al., U.S. Pat. No. 7,025,943, discloses a method for producing cerium dioxide crystals that comprises: mixing a first solution of a water-soluble cerium salt with a second solution of alkali metal or ammonium hydroxide; agitating the resulting reactant solution under turbulent flow conditions while concomitantly passing gaseous oxygen through the solution; and precipitating cerium dioxide particles having a dominant particle size within the range of 3-100 nm. In Example 1, the particle size is stated to be around 3-5 nm. No mention is made of a stabilizing agent and it is anticipated that the sols will eventually agglomerate and settle.

Sandford et al., WO 2008/002223 A2, describe an aqueous precipitation technique that produces cerium dioxide directly without subsequent calcination. Cerous$^{+3}$ cation is oxidized to ceric$^{+4}$ slowly by nitrate ion, and a stable non-agglomerated sol of 11 nm crystallite size (and approximately equal grain size) is obtained when acetic acid is used as a stabilizer. Interestingly, EDTA and citric acid produce grains with crystallite sizes on the order of several hundred nanometers.

Woodhead, James, L. U.S. Pat. No. 4,231,893, teaches the preparation of an aqueous dispersion of ceria by the acid treatment of $Ce(OH)_4$ which has been obtained from the peroxide treatment of $Ce^{+0}$ in base. No sizing data are provided and at the required pH for stabilization, 1.5, the likely stabilizer is $NO_3^-$ anion.

Noh et al., U.S. Patent Appl. Publ. No. 2004/0241070, discloses a method for preparing single crystalline cerium dioxide nanopowder comprising: preparing cerium hydroxide by precipitating a cerium salt in the presence of a solvent mixture of organic solvent and water, preferably in a ratio of about 0.1:1 to about 5:1 by weight; and hydrothermally reacting the cerium hydroxide. The nanopowder has a particle size of about 30-300 nm.

Chan, U.S. Patent Appl. Publ. No. 2005/0031517, discloses a method for preparing cerium dioxide nanoparticles that comprises: rapidly mixing an aqueous solution of cerium nitrate with aqueous hexamethylenetetramine, the temperature being maintained at a temperature no higher than about 320° K while nanoparticles form in the resulting mixture; and separating the formed nanoparticles. The mixing apparatus preferably comprises a mechanical stirrer and a centrifuge. In the illustrative example, the prepared cerium dioxide particles are reported to have a diameter of about 12 nm.

Ying et al., U.S. Pat. Nos. 6,413,489 and 6,869,584, disclose the synthesis by a reverse micelle technique of nanoparticles that are free of agglomeration and have a particle size of less than 100 nm and a surface area of at least 20 $m^2/gm$. The method comprises introducing a ceramic precursor that includes barium alkoxide and aluminum alkoxide in the presence of a reverse emulsion.

A related publication, Ying et al., U.S. Patent Appl. Publ. No. 2005/0152832, discloses the synthesis, by a reverse micelle technique within an emulsion having a 1-40% water content, of nanoparticles that are free of agglomeration and have a particle size of less than 100 nm. The nanoparticles are preferably metal oxide particles, which can be used to oxidize hydrocarbons.

Hanawa et al., U.S. Pat. No. 5,938,837, discloses a method for preparing cerium dioxide particles, intended primarily for use as a polishing agent, that comprises mixing, with stirring, an aqueous solution of cerous nitrate with a base, preferably aqueous ammonia, in such a mixing ratio that the pH value of the mixture ranges from 5 to 10, preferably 7 to 9, then rapidly heating the resulting mixture to a temperature of 70-100° C., and maturing the mixture of cerous nitrate with a base at that temperature to form the grains. The product grains are uniform in size and shape and have an average particle size of 10-80 nm, preferably 20-60 nm.

European Patent Application EP 0208580, published 14 Jan. 1987, inventor Chane-Ching, applicant Rhone Poulenc, discloses a cerium (IV) compound corresponding to the general formula

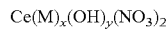

$Ce(M)_x(OH)_y(NO_3)_2$ wherein M represents an alkali metal or quaternary ammonium radical, x is between 0.01 and 0.2, y is such that y=4−z+x, and z is between 0.4 and 0.7. A process for preparing a colloidal dispersion of the cerium (IV) compound produces particles with a hydrodynamic diameter between about 1 nm and about 60 nm, suitably between about 1 nm and about 10 nm, and desirably between about 3 nm and 8 nm.

S. Sathyamurthy et al., Nano Technology 16, (2005), pp 1960-1964, describes the reverse micellar synthesis of $CeO_2$ from cerium nitrate, using sodium hydroxide as the precipitating agent and n-octane containing the surfactant cetyltrimethylammonium bromide (CTAB) and the cosurfactant 1-butanol as the oil phase. The resulting polyhedral particles had an average size of 3.7 nm, and showed agglomeration when removed from their protective reversed micellar structure. Additionally, the reaction would be expected to proceed in low yield (for reactants A and B there are as many AB collisions resulting in product as AA and BB non productive collisions).

Seal et al., *Journal of Nano Particle Research*, (2002), 4, pp 433-448, describes the preparation from cerium nitrate and ammonium hydroxide of nanocrystalline ceria particles for a high-temperature oxidation-resistant coating using an aqueous microemulsion system containing AOT as the surfactant and toluene as the oil phase. The ceria nanoparticles formed in the upper oil phase of the reaction mixture had a particle size of 5 nm.

Seal et al., U.S. Pat. No. 7,419,516, the disclosure of which is incorporated herein by reference, describes the use of rare earth metal oxide, preferably ceria, nanoparticles as fuel additives for reducing soot. The particles, which are prepared by a reverse micelle process using toluene as the oil phase and AOT as the surfactant, have diameters in the range of about 2-7 nm, the mean being about 5 nm.

Pang et al., *J. Mater. Chem.*, 12 (2002), pp 3699-3704, prepared $Al_2O_3$ nanoparticles by a water-in-oil microemulsion method, using an oil phase containing cyclohexane and the non-ionic surfactant Triton X-114, and an aqueous phase containing 1.0 M $AlClO_3$. The resulting $Al_2O_3$ particles, which had a particle size of 5-15 nm, appeared to be distinctly different from the hollow ball-shaped particles of submicron size made by a direct precipitation process.

Cuif et al, U.S. Pat. No. 6,133,194, the disclosure of which is incorporated herein by reference, describes a process that comprises reacting a metal salt solution containing cerium, zirconium, or a mixture thereof, a base, optionally an oxidizing agent, and an additive selected from the group consisting of anionic surfactants, nonionic surfactants, polyethylene glycols, carboxylic acids, and carboxylate salts, thereby forming a product. The product is subsequently calcined at temperatures greater than 500° C. (which would effectively carbonize the claimed surfactants).

It should be appreciated that, while many authors claim ceria nanoparticles well below 5 nm, no X-ray or electron diffraction data have been presented to unequivocally establish that the grains are indeed cubic $CeO_2$ and not hexagonal or cubic $Ce_2O_3$. There is substantial doubt that cubic $CeO_2$ is thermodynamically stable at very small grain sizes, and that the grains are, in fact, the reduced and more stable hexagonal $Ce_2O_3$ form. S. Tsunekawa, R, Sivamohan, S. Ito, A. Kasuya and T. Fukada in *Nanostructured Materials*, vol 11, no. 1, pp 141-147 (1999) "Structural Study on Monosize $CeO_{2-x}$ Nanoparticles" in particular casts doubt upon the existence of $CeO_2$ at or below 1.5 nm.

Additional evidence for the existence of $Ce^{3+}$ (and by extension $Ce_2O_3$) at very small grain diameters comes from the work of Desphande et al. in *Applied Physics Letters* 87, 133113 (2005) "Size Dependency Variation in Lattice Parameter and Valency States in Nano Crystalline Cerium Oxide", who found a log linear relationship between the change in lattice constant, $\Delta a = a - a_0$ ($a_0 = 5.43$ Å in $CeO_2$) and the crystal diameter, $D$, as follows:

$$\log \Delta a = -0.4763 \log D - 1.5029 \quad \text{(Eq. 2)}$$

Thus, a grain diameter of 10 nm will experience a lattice strain or change in the lattice constant of 0.0103 Å or 1.91%, whereas a 1 nm diameter grain will experience a change of 0.031 Å or 5.73 percent.

The extent to which $CeO_2$ can act as a catalytic oxygen storage material, described by equation 1, is governed in part by the $CeO_2$ particle size. At 20 nm particle sizes and below, the lattice parameter increases dramatically with decreasing crystallite size (up to 0.45% at 6 nm, see for example Zhang, et al., *Applied Physics Letters*, 80 1, 127 (2002)). The associated size-induced lattice strain is accompanied by an increase in surface oxygen vacancies that results in enhanced catalytic activity. This inverse size-dependent activity provides not only for more efficient fuel cells, but better oxidative properties when used in the combustion of petroleum fuels.

As described previously, various methods and apparatus have been reported for preparing cerium nanoparticles, including those described by Chane-Ching, et al., U.S. Pat. No. 5,017,352; Hanawa, et al., U.S. Pat. No. 5,938,837; Melard, et al., U.S. Pat. No. 4,786,325; Chopin, et al., U.S. Pat. No. 5,712,218; Chan, U.S. Patent Appl. Publ. No. 2005/0031517; and Zhou, et al., U.S. Pat. No. 7,025,943, the disclosures of which are incorporated herein by reference. However, current methods do not allow the economical, facile (i.e. non-calcined) and unambiguous preparation of cubic $CeO_2$ nanoparticles in high yield, in a short period of time at very high suspension densities (greater than 0.5 molal, i.e., 9 wt. % that are sufficiently small in size (less than 5 nm in mean geometric diameter), uniform in size frequency distribution (coefficient of variation [COV] of less than 25%, where COV is the standard deviation divided by the mean diameter), and stable for many desirable applications. Additionally, it would be very desirable to produce particles that are crystalline, ie, a single crystal rather than an agglomeration of crystallites of various sizes such as are taught in the above mentioned art and technical literature.

Although substantially pure cerium dioxide nanoparticles are beneficially included in fuel additives, it may be of further benefit to use cerium dioxide doped with components that result in the formation of additional oxygen vacancies being formed (Eq. 1). For this to occur, the dopant ion should be divalent or trivalent, i.e., a divalent or trivalent ion of an element that is a rare earth metal, a transition metal or a metal of Group IIA, IIIB, VB, or VIB of the Periodic Table. The requirement for crystal charge neutrality using these lower valence cations will drive Eq. 1 to the right, i.e., higher extent of oxygen vacancy formation. Metal dopant ions with smaller ionic radii than $Ce^{+4}$ (0.97 Å in an octahedral configuration) will also aid in oxygen vacancy formation since this process reduces two adjacent $Ce^{+4}$ ions (one surface and one subsurface) to $Ce^{+3}$ whose resultant larger ionic radius, 1.143 Å, expands the lattice, thereby causing lattice strain, Thus substituting $Zr^{+4}$ (ionic radius 0.84 Å) or $Cu^{+2}$ (ionic radius of six coordinate octahedral configuration is 0.73 Å, four coordinate tetrahedral 0.57 Å) will relieve some of this lattice strain. Additionally, Zr allows the formation of two adjacent surface $Ce^{+3}$ species (rather than one surface and one subsurface), which may be important for very small particles where approximately 50% of the ions are surface ions. One can thus appreciate that substitutional ion doping is preferred to interstitial ion doping, where the dopants occupy spaces between the normal lattice positions.

For the purposes of this discussion, we need to distinguish what is meant by doping as opposed to a lattice engineered crystal. In semiconductor physics, the word doping refers to n or p type impurities present in the parts-per-million range. We use the word doped crystal to refer to a crystal that has on or more metal dopant ions present in concentrations less than 2 mole percent (20,000 ppm). A lattice engineered crystal, on the other hand, can have one or more metal dopant ions present in the $CeO_2$ crystal at concentrations greater than 20,000 ppm up to 800,000 ppm (or 80% of the cerium sub-lattice). Thus a lattice engineered cerium dioxide crystal could have cerium present as the minor metal component.

Doping of cerium dioxide with metal ions to improve ionic transport, reaction efficiency and other properties is described in, for example, "Doped Ceria as a Solid Oxide Electrolyte, H. L. Tuller and A. S. Nowick in J. *Electrochem Soc.*, 1975, 122(2), 255; "Point Defect Analysis and Microstructural Effects in Pure and Donor Doped Ceria", M. R. DeGuire, et. al., *Solid State Ionics*, 1992, 52, 155; and "Studies on Cu/CeO2: A New NO Reduction Catalyst" Parthasarathi Bera, S. T. Aruna, K. C. Patil, and M. S. Hegde in *Journal of Catalysis*, 186, 36-44 (1999) and. The resultant dopant effects on the electronic and oxygen diffusion properties are described by Trovarelli, *Catalysis by Ceria and Related Materials, Catalytic Science Series*, World Scientific Publishing Co., 37-46 (2002) and references cited therein.

Trovarelli et al. in *Catalysis Today*, 43 (1998), 79-88, discuss the preparation of ceria-zirconia mixed oxides of fairly good compositional homogeneity using a surfactant-assisted approach. High specific surface areas, 230 m$^2$/gm, are obtained after calcination of compositions at 723° K; however, sintering occurs at 1173° K as the specific surface area drops to 40 m$^2$/gm (~20 nm diameter).

Pulsed neutron diffraction techniques were used by E. Mamontov, et al. *J. Phys. Chem. B* 2000, 104, 1110-1116 to study ceria and ceria-zirconia solid solutions. These studies established for the first time the correlation between the concentration of vacancy-interstitial oxygen defects and the oxygen storage capability. They postulate that the preservation of oxygen defects, which Zr aids, is necessary to ameliorate the degradation of OSC as a function of thermal aging. $ZrO_2$ was present at 30.5 mole %, and the calcined particles had a diameter of approximately 40 nm, based upon BET surface area measurements.

Z. Yang et al. in *Journal of Chemical Physics*, (2006) 124 (22), 224704/(1-7) calculated from first principles, using density functional theory, that an oxygen vacancy is most easily created close to a Zr center, and therefore these centers serve as a nucleation site for vacancy clustering. The released oxygen donates two electrons to $Ce^{+4}$ centers neighboring the vacancy, resulting in two $Ce^{+3}$ centers.

R. Wang et al. in *J. Chem. Phys. B*, 2006, 110, 18278-18285 examined the spatial distribution of Zr in $Ce_{0.5}Zr_{0.5}O_2$ produced by a spray freezing technique, followed by calcination. They find that particle nanoscale heterogeneity, as characterized by Ce-rich cores and Zr-rich shells in particles in the 5.4 to 25 nm particle size range, is associated with more redox active materials. This finding implies that a homogeneous distribution of Zr and Ce results in decreased activity and is therefore not preferred.

S. Bedrane et al. in *Catalysis Today*, 75, 1-4, 401-405 July 2002, measured the oxygen storage capability (Eq 1.) of 11 precious and noble metal (PM=Rh, Pt, Rd, Ru, and Ir) doped ceria ($CeO_2$) and ceria-zirconia ($Ce_{0.63}Zr_{0.37}O_2$) compositions. They observe a leveling effect in which the Ce—Zr materials have an OSC that is nearly independent of PM concentration and is 2 to 4 times as great as the PM-loaded Ce-only materials.

H. Sparks et al. of Nanophase Technologies, Corp., using vapor phase synthesis, manufactured ceria mixed with rare earth oxide nanomaterials (*Mat. Res. Soc. Symp. Proc.*, Vol 788, 2004). They observe enhanced thermal stability of nanocrystalline particle size and an increase in OSC for the Zr-doped ceria (1:1); however further addition of La or Pr to the Zr composition, while better than ceria itself, was poorer than just the zirconium ceria combination. One can infer, from the reported specific surface areas, a particle size of 10 nm at 600° C., which increases to 40 nm at 1050° C.

The catalytic effects of Zr and Fe doped $CeO_2$ in the combustion of diesel soot were examined by Aneggi et al. in *Catalysis Today*, 114, (2006), 40-47. They reiterated the fact that Zr enhances the thermal stability and OSC of pure ceria and found that $Fe_2O_3$ gave better fresh results, but there was a net loss of activity after calcination. A very systematic level series in Zr and Zr with Fe was examined, including crystallographic data on these calcined particles that were approximately 21 nm. They determined a nanoparticle specific area threshold, 35 $m^2/gm$ (corresponding to a diameter of less than 24 nm), in which the fresh versus aged activity was unchanged.

Copper-based catalytic systems have also received much attention. In a very thorough structural analysis of 3 and 5 atom percent $Cu/CeO_2$, M. S. Hegde et al., *Chem. Mater.* 2002, 14, 3591-3601, demonstrated that Cu forms a distinct solid solution of $Ce_{1-x}Cu_xO_2$ with no discrete CuO phase. In these 50 nm agglomerated grains produced by combustion synthesis, the Cu is in the +2 state and is much more catalytically active than Cu in CuO. Furthermore, the oxygen ion vacancy is created around the $Cu^{+2}$ cation.

A. Martinex-Arias et al. in *J. Phys. Chem. B*, 2005, 109, 19595-19603, found that the reduction of $Ce_{1-x}Cu_xO_2$ fluorite type nanoparticles (x=0.05, 0.1, and 0.2) was reversible and that the oxidation state of Cu was higher than its normal states (+1 or +2). The dopant induced a large lattice strain in these ~6 nm particles in the oxide sub-lattice, which favored the formation of oxygen vacancies. A reverse microemulsion method followed by calcination at 500° C. was used to prepare these materials.

Iron is another metal ion that has imbued $CeO_2$ nanoparticles with enhanced catalytic activity. I. Melian-Cabrera et al. in *Journal of Catalysis*, 239, 2006, 340-346, report enhanced activity (relative to the undoped materials) and optimal catalytic destruction of $N_2O$, an oxygen-limited reaction, with a 50/50 composition of cerium and iron oxide. The Fe-doped ceria is made by a co-precipitation method that produces particles in the 30 nm diameter range.

T. Campenon and colleagues in SAE special publication SP 2004, SP-1860, "Diesel Exhaust Emission Control" use iron doped ceria to control the ash buildup in diesel particulate filters.

R. Hu and colleagues in *Shiyou Huagong* (2006), 35(4), 319-323 examined Fe-doped cerium dioxide made by a solid phase milling technique, followed by calcination at various elevated temperatures. Iron doping improved the catalytic activity with respect to the combustion of methane while simultaneously decreasing particle size.

Illustrative Examples 9 and 10 of U.S. Patent Appl. Publ. No. 2005/0152832 describe the preparation of, respectively, cerium-doped and cerium-coated barium hexaaluminate particles. Example 13 describes the oxidation of methane with the cerium-coated particles.

Talbot et al., U.S. Pat. No. 6,752,979, the disclosure of which is incorporated herein by reference, describes a method of producing metal oxide particles having nano-sized grains that consists of: mixing a solution containing one or more metal cations with a surfactant under conditions such that surfactant micelles are formed within the solution, thereby forming a micellar liquid; and heating the micellar liquid to remove the surfactant and form metal oxide particles having a disordered pore structure. The metal cations are selected from the group consisting of cations from Groups 1A, 2A, 3A, 4A, 5A, and 6A of the Periodic Table, transition metals, lanthanides, actinides, and mixtures thereof. Preparations of particles of cerium dioxide and mixed oxides containing cerium and one or more other metals are included in the illustrative examples.

Illustrative example 9 of U.S. Pat. Nos. 6,413,489 and 6,869,584, the disclosures of which are incorporated herein by reference, describes the inclusion of cerium nitrate in the emulsion mixture to prepare cerium-doped barium hexaaluminate particles, which were collected by freeze drying and calcined under air to 500° C. and 800° C. The resulting particles had grain sizes of less than 5 nm and 7 nm at 500° C. and 800° C., respectively. Illustrative example 10 describes the synthesis of cerium-coated barium hexaaluminate particles. Following calcination, the cerium-coated particles had grain sizes of less than 4 nm, 6.5 nm, and 16 nm at 500° C., 800° C., and 1100° C., respectively.

Wakefield, U.S. Pat. No. 7,169,196 B2, the disclosure of which is incorporated herein by reference, describes a fuel comprising cerium dioxide particles that have been doped with a divalent or trivalent metal or metalloid that is a rare earth metal, a transition metal, or a metal of Group IIa, IIIB, VB, or VIB of the Periodic Table. Copper is disclosed as a preferred dopant.

Oji Kuno in U.S. Pat. No. 7,384,888B2, the disclosure of which is incorporated herein by reference, describes a cerium-zirconium composite metal oxide with a ceria core and zirconia shell having improved high temperature stability and stable OSC. However, calcining at 700° C. is required for the preparation of the material, which shows a 10-20 percent improved catalytic activity with respect to hydrocarbon and carbon monoxide oxidation. No sizing data is provided to support the claim of 5-20 nm particles, no direct OSC measurements are quoted, and there is no analytical data to support the assertion of a core-shell geometry.

With regard to 10 nm diameter or smaller nanoparticles, there are multiple concerns that cast doubt on the ability of metal ion dopants to be incorporated in such small particles. For example, an 8.1 nm particle will have less than 10% of the Ce ions on the surface, whereas a 2.7 nm particle (5 unit cells on an edge of each 0.54 nm/unit cell) will have 46.6% of the 500 Ce ions on the surface. Surface ions are either ½ (for a face) or ⅛ (corner) incorporated into the lattice; therefore, their binding energies are substantially reduced and their coordination requirements unfulfilled. The difficulties associated with the doping of (semiconductor) nanocrystals is discussed in *Science*, 319, Mar. 28, 2008 by Norris et al. Characteristics such as the relative solubility of the dopant in the crystal vs solution, the diffusion of the dopant into the lattice, its formation energy, size and valence relative to the ions that are being replaced, kinetic barriers such as may be imposed by adsorbed surface stabilizers may all play a role in determining the extent, if any, to which a dopant metal ion may be incorporated into nano crystals of these dimensions.

It is clear from the references just described, that, the majority of the doping work has occurred at relatively large particle size (20 nm or so) and was carried out either by calcining the initial cerium-metal dopant mixture, or by micellar synthesis—a process that does not readily lend itself to large scale material production. In the work describing particles of a size less than 10 nm, the crystallographic form has not been established nor has conclusive evidence of incorporation been provided.

Thus there exists a need to readily incorporate a wide variety of metal dopant ions into the cerium sub-lattice of cubic $CeO_2$ for very small nanoparticles (less than about 10 nm diameter) in a facile manner that does not require calcination (500 C or greater) and to unequivocally demonstrate incorporation as opposed to the production a separately nucleated population of dopant metal oxide grains. As single crystal particles of ceria are unique, so too would be a metal lattice engineered variant of ceria. Additionally, it would be desirable to produce large commercially available quantities of these materials in an economical manner and in a relatively short period of time.

A typical chemical reactor that might be used to prepare cerium dioxide includes a reaction chamber that includes a mixer (see, for example, FIG. 1 in Zhou et al. U.S. Pat. No. 7,025,943, the disclosure of which is incorporated herein by reference). A mixer typically includes a shaft, and propeller or turbine blades attached to the shaft, and a motor that turns the shaft, such that the propeller is rotated at high speed (1000 to 5000 rpm). The shaft can drive a flat blade turbine for good meso mixing (micro scale) and a pitched blade turbine for macro mixing (pumping fluid through out the reactor).

Such a device is described in Antoniades, U.S. Pat. No. 6,422,736, the disclosure of which is incorporated herein by reference. The described reactor is useful for fast reactions such as that shown by the equation below, wherein the product, AgCl, is a crystalline material having a diameter on the order of several hundred nanometers up to several thousand nanometers.

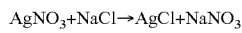

$$AgNO_3 + NaCl \rightarrow AgCl + NaNO_3$$

Cerium dioxide particles prepared using this type of mixing are often too large to be useful for certain applications. It is highly desirable to have the smallest cerium dioxide particles possible as their catalytic propensity, i.e., their ability to donate oxygen to a combustion system (cf. equation 1), increases with decreasing particle size, especially for particles having a mean diameter of less than 10 nm.

PCT/US2007/077545, METHOD OF PREPARING CERIUM DIOXIDE NANOPARTICLES, filed Sep. 4, 2007, describes a mixing device that is capable of producing $CeO_2$ nanoparticles down to 1.5 nm, in high yield and in very high suspension densities. The reactor includes inlet ports for adding reactants, a propeller, a shaft, and a motor for mixing. The reaction mixture is contained in a reactor vessel. Addition to the vessel of reactants such as cerium nitrate, an oxidant, and hydroxide ion can result in the formation of $CeO_2$ nanoparticles, which are initially formed as very small nuclei. Mixing causes the nuclei to circulate; as the nuclei continuously circulate through the reactive mixing regime, they grow (increase in diameter) as they incorporate fresh reactants. Thus, after an initial steady state concentration of nuclei is formed, this nuclei population is subsequently grown into larger particles in a continuous manner. Unless grain growth restrainers are employed to terminate the growth phase, this nucleation and growth process is not desirable if one wishes to limit the final size of the particles while still maintaining a high particle suspension density.

An example of this nucleation and growth process applied to the aqueous precipitation of $CeO_2$ is the work of Zhang et al., *J. Appl. Phys.*, 95, 4319 (2004) and Zhang, et al., *Applied Physics Letters*, 80, 127 (2002). Using cerium nitrate hexahydrate as the cerium source (very dilute at 0.0375M) and 0.5 M hexamethylenetetramine as the ammonia precursor, 2.5 to 425 nm cerium dioxide particles are formed in times less than 50 minutes. These particles are subsequently grown to 7.5 nm or greater using reaction times on the order of 250 minutes or 600 minutes, depending upon growth conditions. The limitations of particle size, concentration and reaction time would exclude this process from consideration as an economically viable route to bulk commercial quantities of $CeO_2$ nanoparticles.

I. H. Leubner, *Current Opinion in Colloid and Interface Science*, 5, 151-159 (2000), *Journal of Dispersion Science and Technology*, 22, 125-138 (2001) and ibid. 23, 577-590 (2002), and references cited therein, provides a theoretical treatment that relates the number of stable crystals formed with molar addition rate of reactants, solubility of the crystals, and temperature. The model also accounts for the effects of diffusion, kinetically controlled growth processes, Ostwald ripening agents, and growth restrainers/stabilizers on crystal number. High molar addition rates, low temperatures, low solubility, and the presence of growth restrainers all favor large numbers of nuclei and consequently smaller final grain or particle size.

In contrast to batch reactors, colloid mills typically have flat blade turbines turning at 10,000 rpm, whereby the materials are forced through a screen whose holes can vary in size from fractions of a millimeter to several millimeters. Generally, no chemical reaction is occurring, but only a change in particle size brought about by milling. In certain cases, particle size and stability can be controlled thermodynamically by the presence of a surfactant. For example, Langer et al., in U.S. Pat. Nos. 6,368,366 and 6,363,237, the disclosures of which are incorporated herein by reference, describe an aqueous micro emulsion in a hydrocarbon fuel composition made under high shear conditions. However, the aqueous particle phase (the discontinuous phase in the fuel composition) has a large size, on the order of 1000 nm.

Colloid mills are not useful for reducing the particle size of large cerium dioxide particles because the particles are too hard to be sheared by the mill in a reasonable amount of time. The preferred method for reducing large agglomerated cerium dioxide particles from the micron size down into the nanometer size is milling for several days on a ball mill in the presence of a stabilizing agent. This is a time consuming, expensive process that invariably produces a wide distribution of particle sizes. Thus, there remains a need for an economical and facile method to synthesize large quantities, at high suspension densities, of very small nanometric particles of cerium dioxide having a uniform size distribution and incorporating one or more transition metal ions while still maintaining the $CeO_2$ cubic fluorite structure.

Aqueous precipitation may offer a convenient route to cerium nanoparticles. However, to be useful as a fuel-borne catalyst for fuels, cerium dioxide nanoparticles must exhibit stability in a nonpolar medium, for example, diesel fuel. Most stabilizers used to prevent agglomeration in an aqueous environment are ill suited to the task of stabilization in a nonpolar environment. When placed in a nonpolar solvent, such particles tend to immediately agglomerate and, consequently, lose some, if not all, of their desirable nanoparticulate properties. Thus, it would be desirable to form stable cerium dioxide particles in an aqueous environment, retain the same stabilizer on the particle surface, and then be able to transfer these particles to a nonpolar solvent, wherein the particles would remain stable and form a homogeneous mixture or dispersion. In this simplified and economical manner, one could eliminate the necessity for changing the affinity of a surface stabilizer from polar to non-polar. Changing stabilizers can involve a difficult displacement reaction or separate, tedious isolation and re-dispersal methods such as, for example, precipitation and subsequent re-dispersal with the new stabilizer using ball milling.

Thus, there remains a need for an efficient and economical method to synthesize stable transition metal-containing cerium dioxide nanoparticles in a polar, aqueous environment, and then transfer these particles to a non-polar environment wherein a stable homogeneous mixture is formed.

The use of cerium nanoparticles to provide a high temperature oxidation resistant coating has been reported, for example, in "Synthesis Of Nano Crystalline Ceria Particles For High Temperature Oxidization Resistant Coating," S. Seal et al., *Journal of Nanoparticle Research*, 4, pp 433-438 (2002). The deposition of cerium dioxide on various surfaces has been investigated, including Ni, chromia and alumina alloys, and stainless steel and on Ni, and Ni—Cr coated alloy surfaces. It was found that a cerium dioxide particle size of 10 nm or smaller is desirable. Ceria particle incorporation subsequently inhibits oxidation of the metal surface.

Rim, U.S. Pat. No. 6,892,531, the disclosure of which is incorporated herein by reference, describes an engine lubricating oil composition for a diesel engine that includes a lubricating oil and 0.05-10 wt. % of a catalyst additive comprising cerium carboxylate.

As described above, currently available cerium oxide- and doped cerium oxide-based fuel additives have improved fuel combustion of diesel engines; however further improvements are still needed. It would be desirable to formulate these fuel additives for diesel engines that provide further improved fuel combustion by taking advantage of even smaller, sub 5 inn nanoparticles of cubic $CeO_2$ with higher specific surface areas. The increased oxygen storage capability enabled by the inclusion of transition metals at these grain sizes is also highly desirable. In addition, protection of engines from wear, reduced engine friction, and greater lubricity, with simultaneously improved fuel efficiency would be tremendously beneficial.

SUMMARY OF THE INVENTION

The present invention is directed to a process for making lattice engineered cerium dioxide nanoparticles containing at least one transition metal (M) that comprises: (a) providing an aqueous reaction mixture comprising a source of cerous ion, a source of one or more transition metal ions (M), a source of hydroxide ion, at least one nanoparticle stabilizer, and an oxidant at an initial temperature in the range of about 20° C. to about 95° C.; (b) mechanically shearing the mixture and causing it to pass through a perforated screen, thereby forming a suspension of cerium hydroxide nanoparticles; and (c) providing temperature conditions effective to enable oxidation of cerous ion to ceric ion, thereby forming a product stream comprising transition metal-containing cerium dioxide nanoparticles, $Ce_{1-x}M_xO_2$. The cerium dioxide nanoparticles thus obtained have a cubic fluorite structure, a mean hydrodynamic diameter in the range of about 1 nm to about 10 nm, and a geometric diameter of about 1 nm about 4 nm.

The present invention is further directed to a process for forming a homogeneous dispersion containing stabilized transition metal-containing cerium dioxide nanoparticles, $Ce_{1-x}M_xO_2$, that comprises: (a) providing an aqueous mixture that includes stabilized transition metal-containing cerium dioxide nanoparticles, $Ce_{1-x}M_xO_2$, having a cubic fluorite structure, a mean hydrodynamic diameter in the range of about 1 nm to about 10 nm, and a geometric diameter of about 1 nm to about 4 nm; (b) concentrating the aqueous mixture that includes the stabilized transition metal-containing cerium dioxide nanoparticles, thereby forming an aqueous concentrate; (c) removing substantially all the water from the aqueous concentrate, thereby forming a substantially water-free concentrate of the stabilized transition metal-containing cerium dioxide nanoparticles; (d) adding an organic diluent to the substantially water-free concentrate, thereby forming an organic concentrate of the stabilized transition metal-containing cerium dioxide nanoparticles; and (d) combining the organic concentrate with a surfactant in the presence of a nonpolar medium, thereby forming a homogeneous dispersion containing stabilized transition metal-containing cerium dioxide nanoparticles, $Ce_{1-x}M_xO_2$, wherein "x" has a value from about 0.3 to about 0.8

BRIEF DESCRIPTION OF THE DRAWINGS

FIG. 3C is TABLE 1, containing calculated vs measured electron diffraction intensities for cubic and hexagonal $CeO_2$ and $Ce_2O_3$ lattices.

FIGS. 6A and 6B are, respectively, a TEM image and a particle size-frequency analysis by TEM of isothermally precipitated Fe-containing $CeO_2$ nanoparticles, prepared as described in Example 5.

FIGS. 8A and 8B are respectively, a TEM image and a particle size-frequency analysis by TEM of isothermally precipitated $CeO_2$ nanoparticles containing Zr and Fe, prepared as described in Example 7. FIG. 8C are x-ray diffraction spectra of isothermally precipitated $CeO_2$ nanoparticles and of isothermally precipitated $CeO_2$ nanoparticles containing Zr and Fe, prepared as described in Example 7.

DETAILED DESCRIPTION OF THE INVENTION

Figure 1A:
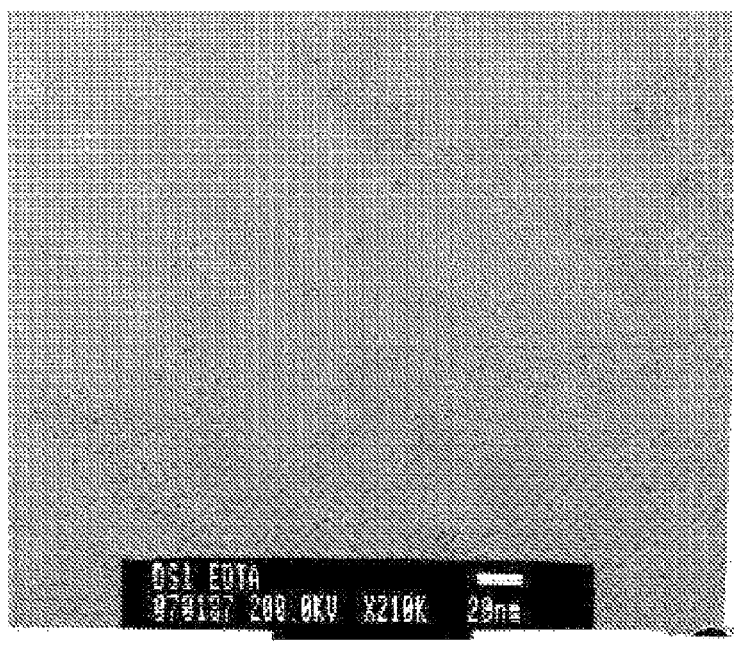
FIGS. 1A and 1B are, respectively, a TEM image and a particle size frequency analysis by TEM of $CeO_2$ nanoparticles prepared by non-isothermal precipitation, as described in Example 1.

In this application, the term "transition metal" is understood to encompass the 40 chemical elements 21 to 30, 39 to 48, 72 to 80, which are included in Periods 4, 5, 6, respectively, of the Periodic Table The present invention provides a process for making transition metal ion-containing cerium dioxide ($CeO_2$) nanoparticles that comprises: (a) providing an aqueous reaction mixture comprising a source of cerous ion and one or more transition metal ions, a source of hydroxide ion, at least one nanoparticle stabilizer, and an oxidant; (b) mechanically shearing the mixture and causing it to pass through a perforated screen, thereby forming a suspension of cerium hydroxide nanoparticles; and (c) providing temperature conditions effective to enable oxidation of cerous ion to eerie ion, thereby forming a product stream comprising transition metal-containing cerium dioxide nanoparticles, $Ce_{1-x}M_xO_2$, that have the cubic fluorite structure, with a mean hydrodynamic diameter in the range of about 1 nm to about 10 nm and a geometric diameter of about 1 nm to about 4 nm. Crystalline, cerium dioxide particles containing one or more transition metal ions and having a monomodal size distribution and a monodisperse size frequency distribution can be selectively prepared within this size range. The single crystalline particles contain either two unit cells per edge for 1.1 nm particles up to 5 unit cells per edge for 2.7 nm particles depending upon the conditions of preparation. Here the word crystalline refers to particles that are not composed of multiple, agglomerated crystallites of various sizes but rather a single crystal of well defined dimensions dictated by the number of constituent unit cells.

The present invention further provides for a continuous process for producing crystalline cerium dioxide $CeO_2$ nanoparticles containing one or more transition metal ions and having a mean hydrodynamic diameter of about 1 nm to about 10 nm, wherein the process comprises the step of combining cerous ion, one or more transition metal ions, an oxidant, at least one nanoparticle stabilizer, and hydroxide ion within a continuous reactor.

The present invention also provides a process for making cerium dioxide nanoparticles that comprises the steps of (a) providing an aqueous first reaction mixture comprising a source of cerous ion, one or more transition metal ions and at least one nanoparticle stabilizer; (b) stirring the first reaction mixture while adding an oxidant, thereby producing a second reaction mixture; (c) adding a source of hydroxide ion to the second reaction mixture while subjecting it to mechanical shearing, thereby forming a third reaction mixture; and (d) heating the third reaction mixture to a temperature between about 50° C. and about 100° C., thereby producing crystalline cerium dioxide nanoparticles that contain one or more transition metal ions and are substantially monomodal and uniform in size frequency distribution.

The present invention further provides a process for forming a homogeneous mixture that includes the aforementioned crystalline cerium dioxide nanoparticles, at least one nanoparticle stabilizer, at least one surfactant, a glycol ether mixture, and a nonpolar medium. The process comprises the steps of: (a) providing an aqueous mixture that includes stabilized crystalline cerium dioxide nanoparticles produced by close association of the nanoparticle stabilizer with the crystalline cerium dioxide nanoparticles; (b) concentrating the aqueous mixture including stabilized crystalline cerium dioxide nanoparticles to form an aqueous concentrate; and (c) removing substantially all of the water by solvent shifting from an aqueous environment to an glycol ether environment, combining the surfactant and optionally a co-surfactant with the solvent shifted concentrate in the presence of the nonpolar medium, thereby forming the homogeneous mixture.

In the presence of hydroxide ion, eerie ion reacts to form cerium hydroxide, which on heating is converted to crystalline cerium dioxide. The temperature in the reaction vessel is maintained between about 50° C. and about 100° C., more preferably about 65-95° C., most preferably about 85° C. Time and temperature can be traded off, higher temperatures typically reducing the time required for conversion of the hydroxide to the oxide. After a period at these elevated temperatures, on the order of about 1 hour or less and suitably about 0.5 hour, the cerium hydroxide is converted to crystalline cerium dioxide, and the temperature of the reaction vessel is lowered to about 15-25° C. Subsequently, the crystalline cerium dioxide nanoparticles are concentrated, and the unreacted cerium and waste by-products such as ammonium nitrate are removed, most conveniently, for example, by diafiltration.

In one aspect of the present invention, a method of making crystalline cerium dioxide nanoparticles containing one or more transition metal ions includes: providing an aqueous reaction mixture comprising cerous ion, one or more transition metal ions, hydroxide ion, a stabilizer or combination of stabilizers, and an oxidant, the reaction being carried out at a temperature effective to generate small nuclei size and to achieve subsequent oxidation of cerous ion to ceric ion and enable the nuclei to be grown into nanometric cerium dioxide. The reaction mixture is subjected to mechanical shearing, preferably by causing it to pass through a perforated screen, thereby forming a suspension of crystalline cerium dioxide nanoparticles having a mean hydrodynamic diameter in the range of about 1 nm to about 10 nm. While the particle diameter can be controlled within the range of 1.5 nm to 25 nm, preferably the crystalline cerium dioxide nanoparticles have a mean hydrodynamic diameter of about 10 nm or less, more preferably about 8 nm or less, most preferably, about 6 nm. Desirably, the nanoparticles comprise one or at most two primary crystallites per particle edge, each crystallite being on average 2.5 nm (approximately 5 unit cells). Thus, the resulting nanoparticle size frequency in substantially monodisperse, i.e., having a coefficient of variation (COV) less than 25%, where the COV is defined as the standard deviation divided by the mean.

Mechanical shearing includes the motion of fluids upon surfaces such as those of a rotor, which results in the generation of shear stress. Particularly, the laminar flux on a surface has a zero velocity, and shear stress occurs between the zero-velocity surface and the higher-velocity flow away from the surface.

In one embodiment, the current invention employs a colloid mill, which is normally used for milling microemulsions or colloids, as a chemical reactor to produce cerium dioxide nanoparticles. Examples of useful colloid mills include those described by Korstvedt, U.S. Pat. Nos. 6,745,961 and 6,305,626, the disclosures of which are incorporated herein by reference.

Desirably, the reactants include an aqueous solution of a cerous ion source, for example, cerous nitrate; an oxidant such as hydrogen peroxide or molecular oxygen; and a stabilizer such as, for example, 2-[2-(2-methoxyethoxy) ethoxy]acetic acid. Typically, a two-electron oxidant such as peroxide is present, preferably in at least one-half the molar concentration of the cerium ion. The hydroxide ion concentration is preferably at least twice, more preferably three times, or may even be five times the molar cerium ion concentration.

Initially, the reaction chamber is maintained at a temperature sufficiently low to generate small cerous hydroxide nuclei size, which can be grown into nanometric crystalline cerium dioxide particles after a subsequent shift to higher temperatures, resulting in conversion of the cerous ion into the ceric ion state. Initially, the temperature is suitably about 25° C. or less, although higher temperatures may be used without a significant increase in particle size.

In one embodiment, a source of cerous ion, one or more transition metal ions, a nanoparticle stabilizer, and an oxidant are placed in the reactor, and a source of hydroxide ion such as ammonium hydroxide is rapidly added with stirring, preferably over a time period of about 10 minutes or less. Under certain conditions such as a single jet addition of ammonia to metal ions, about 20 seconds or less is preferred, even more preferably about 15 seconds or less. In an alternative embodiment, a source of hydroxide ion and an oxidant is placed in the reactor, and a source of cerous ion and one or more transition metal ions are added over a period of about 15 seconds up to 20 minutes. In a third and preferred embodiment, the stabilizers are placed in the reaction vessel, and the cerous nitrate with one or more transition metal ions are simultaneously introduced into the reaction chamber with a separate jet of ammonium hydroxide at the optimum molar stoichiometric ratio of 2:1, 3:1 or even 5:1 OH:Ce.

Cerous ion reacts with the oxidant in the presence of hydroxide ion to form cerium hydroxide, which can be converted by heating to crystalline cerium dioxide. The temperature in the reaction vessel is maintained between about 50° C. and about 100° C., preferably about 65-85° C., more preferably about 70° C. The incorporation of certain transition metal ions such as Zr and Cu typically require higher temperatures, about 85° C. After a period of time at these elevated temperatures, preferably about 1 hour or less, more preferably about 0.5 hour, the doped cerium hydroxide has been substantially converted to crystalline cerium dioxide, and the temperature of the reaction vessel is lowered to about 15-25° C. The time and temperature variables may be traded off, higher temperatures generally requiring shorter reaction times. The suspension of cerium dioxide nanoparticles is concentrated, and the unreacted cerium and waste by-products such as ammonium nitrate are removed, which may be conveniently accomplished by diafiltration.

The nanoparticle stabilizer is a critical component of the reaction mixture. Desirably, the nanoparticle stabilizer is water-soluble and forms weak bonds with cerium ion. $K_{BC}$ represents the binding constant of the nanoparticle stabilizer to cerium ion in water. Log $K_{BC}$ for the nitrate ion is 1 and for hydroxide ion is 14. Most desirably, log $K_{BC}$ lies within this range, preferably in the middle of this range. Useful nanoparticle stabilizers include alkoxysubstituted carboxylic acids, α-hydroxyl carboxylic acids, α-keto carboxylic acids such as pyruvic acid, and small organic polyacids such as tartaric acid and citric acid. Examples of alkoxylated carboxylic acids include; methoxy acetic acid, 2-(methoxy) ethoxy acetic acid and 2-[2-(2-methoxyethoxy)ethoxy]acetic acid (MEEA). Among the α-hydroxycarboxylic acids, examples include lactic acid, gluconic acid and 2-hydroxybutanoic acid. Polyacids include ethylenediaminetetraacetic acid (EDTA), tartaric acid, and citric acid. Combinations of compounds with large $K_{BC}$ such as EDTA with weak $K_{BC}$ stabilizers such as lactic acid are also useful at particular ratios. Large $K_{BC}$ stabilizers such as gluconic acid may be used at a low level, or with weak $K_{BC}$ stabilizers such as lactic acid.

In one desirable embodiment, the nanoparticle stabilizer includes a compound of formula (Ia). In formula (Ia), R represents hydrogen, or a substituted or unsubstituted alkyl group or aromatic group such as, for example, a methyl group, an ethyl group or a phenyl group. More preferably, R represents a lower alkyl group such as a methyl group. $R^1$ represents hydrogen or a substituent group such as an alkyl group. In formula (Ia), n represents an integer of 0-5, preferably 2, and Y represents H or a counterion such as an alkali metal, for example, Na⁺ or K⁺. The stabilizer binds to the nanoparticles and prevents agglomeration of the particles and the subsequent formation of large clumps of particles.

$$RO(CH_2CH_2O)_nCHR^1CO_2Y \qquad (Ia)$$

In another embodiment, the nanoparticle stabilizer is represented by formula (Ib), wherein each $R^2$ independently represents a substituted or unsubstituted alkyl group or a substituted or unsubstituted aromatic group. X and Z independently represent H or a counterion such as Na⁺ or K⁺, and p is 1 or 2.

$$XO_2C(CR^2)_pCO_2Z \qquad (Ib)$$

Useful nanoparticle stabilizers are also found among α-hydroxysubstituted carboxylic acids such as lactic acid and among the polyhydroxysubstituted acids such as gluconic acid.

Preferably, the nanoparticle stabilizer does not include the element sulfur, since sulfur-containing materials may be undesirable for certain applications. For example, if the cerium dioxide particles are included in a fuel additive composition, the use of a sulfur-containing stabilizer such as AOT may result in the undesirable emission of oxides of sulfur after combustion.

The size of the resulting cerium dioxide particles can be determined by dynamic light scattering, a measurement technique for determining the hydrodynamic diameter of the particles. The hydrodynamic diameter (cf. B. J. Berne and R. Pecora, "Dynamic Light Scattering: With Applications to Chemistry, Biology and Physics", John Wiley and Sons, NY 1976 and "Interactions of Photons and Neutrons with Matter", S. H. Chen and M. Kotlarchyk, World Scientific Publishing, Singapore, 1997), which is slightly larger than the geometric diameter of the particle, includes both the native particle size and the solvation shell surrounding the particle. When a beam of light passes through a colloidal dispersion, the particles or droplets scatter some of the light in all directions. When the particles are very small compared with the wavelength of the light, the intensity of the scattered light is uniform in all directions (Rayleigh scattering). If the light is coherent and monochromatic as, for example, from a laser, it is possible to observe time-dependent fluctuations in the scattered intensity, using a suitable detector such as a photomultiplier capable of operating in photon Counting mode. These fluctuations arise from the fact that the particles are small enough to undergo random thermal Brownian motion, and the distance between them is therefore constantly varying. Constructive and destructive interference of light scattered by neighboring particles within the illuminated zone gives rise to the intensity fluctuation at the detector plane, which, because it arises from particle motion, contains information about this motion. Analysis of the time dependence of the intensity fluctuation can therefore yield the diffusion coefficient of the particles from which, via the Stokes Einstein equation and the known viscosity of the medium, the hydrodynamic radius or diameter of the particles can be calculated.

In another aspect of the invention, a continuous process for producing small, transition metal ion-containing crystalline cerium dioxide nanoparticles, that is, particles having a mean diameter of less than about 10 nm, includes combining cerous ion, one or more transition metal ions, an oxidant, a nanoparticle stabilizer or stabilizer combination, and hydroxide ion within a continuous reactor, into which reactants and other ingredients are continuously introduced, and from which product is continuously removed. Continuous processes are described, for example, in Ozawa, et al., U.S. Pat. No. 6,897,270; Nickel, et al., U.S. Pat. No. 6,723,138; Campbell, et al., U.S. Pat. No. 6,627,720; Beck, U.S. Pat. No. 5,097,090; and Byrd, et al., U.S. Pat. No. 4,661,321; the disclosures of which are incorporated herein by reference.

A solvent such as water is often employed in the process. The solvent dissolves the reactants, and the flow of the solvent can be adjusted to control the process. Advantageously, mixers can be used to agitate and mix the reactants.

Any reactor that is capable of receiving a continuous flow of reactants and delivering a continuous flow of product can be employed. These reactors may include continuous-stirred-tank reactors, plug-flow reactors, and the like. The reactants required to carry out the nanoparticle synthesis are preferably charged to the reactor in streams; i.e., they are preferably introduced as liquids or solutions. The reactants can be charged in separate streams, or certain reactants can be combined before charging the reactor.

Reactants are introduced into the reaction chamber provided with a stirrer through one or more inlets. Typically, the reactants include an aqueous solution of a cerous ion source, for example, cerous nitrate, a transition metal ion such as, for example, ferric nitrate or cupric nitrate; an oxidant such as hydrogen peroxide or molecular oxygen, including ambient air; and a stabilizer, such as, for example, 2-[2-(2-methoxyethoxy)ethoxy]acetic acid. A two-electron oxidant such as hydrogen peroxide is present, preferably in at least one-half the molar concentration of the cerium ion. Alternatively, molecular oxygen can be bubbled through the mixture. The hydroxide ion concentration is preferably at least twice the molar cerium concentration.

In one embodiment of the present invention, a method of forming small cerium dioxide nanoparticles includes the step of forming a first aqueous reactant stream that includes cerous ion, for example, as cerium (III) nitrate, one or more transition metal ions, and an oxidant. Suitable oxidants capable of oxidizing Ce(III) to Ce(IV) include, for example, hydrogen peroxide or molecular oxygen. Optionally, the first reactant stream also includes a nanoparticle stabilizer that binds to doped cerium dioxide nanoparticles, thereby preventing agglomeration of the particles. Examples of useful nanoparticle stabilizers were mentioned above.

The method further includes a step of forming a second aqueous reactant stream that includes a hydroxide ion source, for example, ammonium hydroxide or potassium hydroxide. Optionally, the second reactant stream further includes a stabilizer, examples of which were described previously. At least one of the first or second reactant streams, however, must contain a stabilizer or stabilizer combination.

The first and second reactant streams are combined to form a reaction stream. Initially, the temperature of the reaction stream is maintained sufficiently low to form small cerous hydroxide nuclei. Subsequently the temperature is raised so that oxidation of Ce(III) to Ce(IV) occurs in the presence of the oxidant, and the hydroxide is converted to the oxide, thereby producing a product stream that includes crystalline cerium dioxide. The temperature for conversion from the hydroxide to the oxide is preferably in the range of about 50-100° C., more preferably about 60-90° C. In one embodiment, the first and second reactant streams are combined at a temperature of about 10-20° C., and the temperature is subsequently increased to about 60-90° C. Isothermal precipitation at an elevated temperature, e.g., 90° C., is an alternative method for producing small nanoparticles provided that the growth stage can be inhibited by a suitable molecular adsorbate (growth restrainer).

Desirably, the lattice engineered, crystalline cerium dioxide nanoparticles in the product stream are concentrated, for example, by diafiltration techniques using one or more semi-porous membranes. In one embodiment, the product stream includes an aqueous suspension of transition metal-containing crystalline cerium dioxide nanoparticles that is reduced to a conductivity of about 5 mS/cm or less by one or more semi-porous membranes.

A schematic representation of a continuous reactor suitable for the practice of the invention is depicted in FIG. 3 of PCT/US2007/77545, METHOD OF PREPARING CERIUM DIOXIDE NANOPARTICLES, filed Sep. 4, 2007. The reactor 40 includes a first reactant stream 41 containing aqueous cerium nitrate. An oxidant such as hydrogen peroxide is added to the reactant stream by means of inlet 42, and the reactants are mixed by mixer 43a. To the resulting mixture is added stabilizer via inlet 45, followed by mixing by mixer 43b. The mixture from mixer 43b then enters mixer 43c, where it is combined with a second reactant stream containing ammonium hydroxide from inlet 44. The first and second reactant streams are mixed using a mixer 43c to form a reaction stream that may be subjected to mechanical shearing by passing it through a perforated screen. In a further embodiment, mixer 43c comprises a colloid mill reactor, as described previously, that is provided with inlet ports for receiving the reactant streams and an outlet port 45. In a further embodiment, the temperature of the mixer 43c is maintained at a temperature in the range of about 10° C. to about 25° C.

The mixture from 43c enters a reactor tube 45 that is contained in a constant temperature bath 46 that maintains tube 45 at a temperature of about 60-90° C. Crystalline cerium dioxide nanoparticles are formed in the reactor tube 45, which may include a coil 50. The product stream then enters one or more diafiltration units 47, wherein the crystalline cerium dioxide nanoparticles are concentrated using one or more semi-porous membranes. One or more diafiltration units may be connected in series to achieve a single pass concentration of product, or the units may placed in parallel for very high volumetric throughput. The diafiltration units may be disposed both in series and parallel to achieve both high volume and rapid throughput. Concentrated crystalline cerium dioxide nanoparticles exit the diafiltration unit via exit port 49, and excess reactants and water are removed from the diafiltration unit 47 via exit port 48. In an alternative embodiment, stabilizer may be added to the second reactant stream via port 51 rather than to the first reactant stream via port 45.

In one embodiment of the invention, the product stream of concentrated lattice engineered, crystalline cerium dioxide nanoparticles exiting the diafiltration unit 47 is solvent shifted into a substantially water-free environment of one or more glycol ethers. This can be accomplished with dialysis bags or by running the aqueous nanoparticles though a diafiltration column with an organic diluent that preferably comprises one or more glycol ethers. The organic diluent may further include an alcohol. A useful diluent comprises a mixture of diethylene glycol monomethyl ether and 1-methoxy-2-propanol.

The resulting solvent-shifted organic concentrate is combined with a surfactant such as oleic acid, followed by combination with a stream that includes a nonpolar solvent such as kerosene or ultra low sulfur diesel fuel, thereby forming a homogeneous dispersion of lattice engineered, crystalline cerium dioxide nanoparticles that is miscible with hydrocarbon fuels such as diesel.

The use of a continuous process for producing lattice engineered, crystalline cerium dioxide nanoparticles allows better control of the production of particle nuclei and their growth relative to that afforded by batch reactors. The nuclei size can be controlled by the initial reagent concentration, temperature, and the ratio of nanoparticle stabilizer to reagent concentrations. Small nuclei are favored by low temperatures, less than about 20° C., and high ratios of nanoparticle stabilizer to reagent concentrations. In this way, very small nanoparticles having a mean hydrodynamic diameter of less than about 10 nm, with geometrical particle diameters less than about 3 nm, can be produced in an economical manner.

The invention provides a method for formulating a homogeneous mixture that includes cerium dioxide ($CeO_2$) nanoparticles containing one or more transition metal ions, a nanoparticle stabilizer, a surfactant, glycol ethers, and a nonpolar solvent. Preferably, the nanoparticles have a mean hydrodynamic diameter of less than about 10 nm, more preferably less than about 8 nm, most preferably about 6 nm with geometric particle diameters (as determined by TEM) less than about 4 nm.

As described above, lattice engineered, crystalline cerium dioxide nanoparticles can be prepared by various procedures. Typical synthetic routes utilize water as a solvent and yield an aqueous mixture of nanoparticles and one or more salts. For example, cerium dioxide particles can be prepared by reacting the hydrate of cerium (III) nitrate with hydroxide ion from, for example, aqueous ammonium hydroxide, thereby forming cerium (III) hydroxide, as shown in equation (3a). Cerium hydroxide can be oxidized to cerium (IV) dioxide with an oxidant such as hydrogen peroxide, as shown in equation (3b). The analogous tris hydroxide stoichiometry is shown in equations (4a) and (4b).

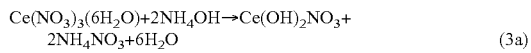
$$Ce(NO_3)_3(6H_2O)+2NH_4OH \rightarrow Ce(OH)_2NO_3 + 2NH_4NO_3+6H_2O \qquad (3a)$$

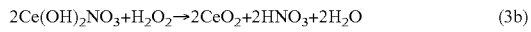
$$2Ce(OH)_2NO_3+H_2O_2 \rightarrow 2CeO_2+2HNO_3+2H_2O \qquad (3b)$$

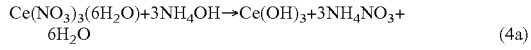
$$Ce(NO_3)_3(6H_2O)+3NH_4OH \rightarrow Ce(OH)_3+3NH_4NO_3+6H_2O \qquad (4a)$$

$$2Ce(OH)_3+H_2O_2 \rightarrow 2CeO_2+4H_2O \qquad (4b)$$

Complexes formed with very high base levels, e.g. 5:1 OH:Ce, also provide a route to cerium oxide, albeit a much larger grain sizes if not properly growth-restrained.

In some cases, especially where ammonium hydroxide is not present in excess relative to the cerous ion, the species $Ce(OH)_2(NO_3)$ or $(NH_4)_2Ce(NO_3)_5$ may initially be present, subsequently undergoing oxidation to cerium dioxide.

The transition metal containing, crystalline cerium dioxide particles are formed in an aqueous environment and combined with one or more nanoparticle stabilizers. Desirably, the cerium dioxide nanoparticles are either formed in the presence of the stabilizer(s), or a stabilizer(s) is added shortly after their formation. Useful nanoparticle stabilizers include alkoxysubstituted carboxylic acids, α-hydroxyl carboxylic acids such as pyruvic acid, and small organic polycarboxylic acids. Examples of alkoxysubstituted carboxylic acids include methoxyacetic acid, 2-(methoxy) ethoxy acetic acid and 2-[2-(2-methoxyethoxy)ethoxy]acetic acid (MEEA). Examples of α-hydroxy carboxylic acids include lactic acid, gluconic acid, and 2-hydroxybutanoic acid. Polycarboxylic acids include ethylenediaminetetraacetic acid (EDTA), tartaric acid, and citric acid. In desirable embodiments, the nanoparticle stabilizer includes a compound of formula (Ia) or formula (Ib), as described above.

The reaction mixture includes, in addition to transition metal containing, crystalline cerium dioxide particles, one or more salts, for example, ammonium nitrate and unreacted cerium nitrate. The stabilized particles can be separated from these materials and salts by washing with 18 Mohm water in an ultrafiltration or diafiltration apparatus. Low ionic strength (<5 mS/cm) is highly desirable for particle formation and stabilization in a non-polar medium. The washed, stabilized cerium dioxide nanoparticles may be concentrated, if desired, using a semi-porous membrane, for example, to form an aqueous concentrate of the nanoparticles. The particles may be concentrated by other means as well, for example, by centrifugation.

In one preferred embodiment, the transition metal containing, crystalline cerium dioxide particles are concentrated by diafiltration. The diafiltration technique utilizes ultrafiltration membranes, which can be used to completely remove, replace, or lower the concentration of salts in the nanoparticle-containing mixture. The process selectively utilizes semi-permeable (semi-porous) membrane filters to separate the components of the reaction mixture on the basis of their molecular size. Thus, a suitable ultrafiltration membrane would be sufficiently porous so as to retain the majority of the formed nanoparticles, while allowing smaller molecules such as salts and water to pass through the membrane. In this way, the nanoparticles and the associated bound stabilizer can be concentrated. The materials retained by the filter, including the stabilized nanoparticles, are referred to as the concentrate or retentate, the discarded salts and unreacted materials as the filtrate.

Pressure may be applied to the mixture to accelerate the rate at which small molecules pass through the membrane (flow rate) and to speed the concentration process. Other means of increasing the flow rate include using a large membrane having a high surface area, and increasing the pore size of the membrane, but without an unacceptable loss of nanoparticles.

In one embodiment, the membrane is selected so that the average pore size of the membrane is about 30% or less, 20% or less, 10% or less, or even 5% or less than that of the mean diameter of the nanoparticles. However, the pore diameter must be sufficient to allow passage of water and salt molecules. For example, ammonium nitrate and unreacted cerium nitrate should be completely or partially removed from the reaction mixture. In one preferred embodiment, the average membrane pore size is sufficiently small to retain particles of 1.5 nm diameter or greater in the retentate. This would correspond to a protein size of approximately 3 kilodaltons.

Desirably, the concentrate includes stabilized nanoparticles and residual water. In one embodiment, the concentration of cerium dioxide nanoparticles is preferably greater than about 0.5 molal, more preferably greater than about 1.0 molal, even more preferably greater than about 2.0 molal (approximately 35% solids in a given dispersion).

Once the concentrate is formed, most if not all of the water is removed by dialysis with glycol ethers. This is accomplished by placing the concentrate in a 2 kilodalton dialysis bag with a mixture of diethylene glycol methyl ether and 1-methoxy-2-propanol, and letting the water exchange into the glycol ether medium while the glycol ether medium displaces the water in the nanoparticle dispersion. Several exchanges may be necessary (changes of glycol ether medium). Alternatively, the glycol ether mixture can be run with the aqueous transition metal containing, crystalline cerium dioxide particles through a diafiltration column and a solvent shift effected in this manner.

Glycol ether surfactants that contain both an ether group and an alcohol group includes compounds of formula (Ic), in which $R^3$ represents a substituted or unsubstituted alkyl group, and m is an integer of 1-8.

$$R^3(OCH_2CH_2)_mOH \quad (Ic)$$

Other useful surfactants to effect the solvent shift include nonylphenyl ethoxylates having the formula, $C_9H_{19}C_6H_4(OCH_2CH_2)_nOH$, wherein n is 4-6.

Once the transition metal containing, crystalline cerium dioxide particles are in an organic medium, still stabilized with the original stabilizer used in their manufacture but complexed by the glycol ether, the mixture can be dispersed into a non-polar medium such as kerosene, which is compatible with most hydrocarbon fuels such as diesel and biodiesel. The surface of the particle is first functionalized with a surfactant such as oleic acid and optionally a co-surfactant such as 1-hexanol before being added to the hydrocarbon diluent. It is important to realize that this composition of matter is not a reverse micelle water-in-oil emulsion, as there is very little water present; rather, the positive charge on the surface of the cerium nanoparticle has been complexed by the ether oxygen atoms and bound to the oppositely charged carboxylic acid. The carboxylic acid is present in a chemisorbed state and facilitates the miscibility of the nanoparticle with a non-polar hydrocarbon diluent. Other surface functionalization materials such as linoleic acid, stearic acid, and palmitic acid may be used in place of oleic acid. In general, the preferred materials are carboxylic acids with carbon chain lengths less than 20 carbon atoms but greater than 8 carbon atoms. Other suitable nonpolar diluents include, for example, hydrocarbons containing about 8 to 20 carbon atoms, for example, octane, nonane, decane and toluene, and hydrocarbon fuels such as gasoline, biodiesel, and diesel fuels.

For optimal miscibility and stability with non-polar hydrocarbons, it is desirable that very few ions be present in the cerium dioxide concentrate to conduct electricity. This situation Can be achieved by concentrating the nanoparticles through diafiltration to a conductivity level of less than about 5 mS/cm, preferably to about 3 mS/cm or less.

Resistivity is the reciprocal of conductivity, which is the ability of a material to conduct electric current. Conductivity instruments can measure conductivity by including two plates that are placed in the sample, applying a potential across the plates (normally a sine wave voltage), and measuring the current. Conductivity (G), the inverse of resistivity (R), is determined from the voltage and current values according to Ohm's law, G=1/R=I/E, where I is the current in amps and E is the voltage in volts. Since the charge on ions in solution facilitates the conductance of electrical current, the conductivity of a solution is proportional to its ion concentration. The basic unit of conductivity is the siemens (S), or milli-Siemens (mS). Since cell geometry affects conductivity values, standardized measurements are expressed in specific conductivity units (mS/cm) to compensate for variations in electrode dimensions.

The present invention is further directed to a method for formulating a homogeneous mixture that includes transition metal-containing cerium dioxide nanoparticles, at least one nanoparticle stabilizer, one or more solvent shifted media such as glycol ethers, at least one surfactant, and a nonpolar diluent or solvent. A first step provides an aqueous mixture that includes stabilized cerium dioxide nanoparticles, wherein molecules of the nanoparticle stabilizer are closely associated with the nanoparticles. A second step includes concentrating the stabilized crystalline cerium dioxide nanoparticles while minimizing the ionic strength of the suspension to form an aqueous concentrate that is relatively free of anions and cations. A third step removes the water associated with the nanoparticles using a non-ionic surfactant. A final step includes combining this solvent shifted concentrate with a nonpolar solvent, containing a surfactant, thereby forming a substantially homogeneous mixture that is a thermodynamically stable, multicomponent, bi-phasic dispersion.

The substantially homogeneous thermodynamic dispersion contains a minimal amount of water at a level of preferably no more than about 0.5 wt. %.

The transition metal-containing cerium dioxide nanoparticles have a mean hydrodynamic diameter of preferably less than about 10 nm, more preferably less than about 8 nm, most preferably about 6 nm, and a geometric diameter of about 4 nm or less.

Desirably, the cerium dioxide nanoparticles have a primary crystallite size of about 2.5 nm±0.5 nm and comprise one or at most two crystallites per particle edge length.

The aqueous mixture is advantageously formed in a colloid mill reactor, and the nanoparticle stabilizer may comprise an ionic surfactant, preferably a compound that includes a carboxylic acid group and an ether group. The nanoparticle stabilizer may comprise a surfactant of formula (Ia), $$RO(CH_2CH_2O)_nCHR^1CO_2Y \quad (Ia)$$

wherein: R represents hydrogen or a substituted or unsubstituted alkyl group or a substituted or unsubstituted aromatic group; $R^1$ represents hydrogen or an alkyl group; Y represents H or a counterion; and n is 0-5. Preferably, R represents a substituted or unsubstituted alkyl group, $R^1$ represents hydrogen, Y represents hydrogen, and n is 2.

Another suitable nanoparticle stabilizer comprises a dicarboxylate of formula (Ib), $$XO_2C(CR^2)_pCO_2Z \quad (Ib)$$

wherein each $R^2$ independently represents hydrogen, a substituted or unsubstituted alkyl group or a substituted or unsubstituted aromatic group; X and Z independently represent H or a counterion; and p is for 2.

Other useful nanoparticle stabilizers are included in the group consisting of lactic acid, gluconic acid enantiomers, EDTA, tartaric acid, citric acid, and combinations thereof.

Concentrating the aqueous mixture is preferably carried out using diafiltration, which results in the reduction in conductivity of said concentrated aqueous mixture to about 5 mS/cm or less.

The surfactant used to shift the stabilized transition metal containing, crystalline cerium dioxide particles from an aqueous to a non-aqueous environment may advantageously comprise a nonionic surfactant, preferably a compound comprising an alcohol group and an ether group, in particular, a compound of formula (Ic),

$$R^3(OCH_2CH_2)_mOH \quad \text{(Ic)}$$

wherein $R^3$ represents a substituted or unsubstituted alkyl group; and m is an integer from 1 to 8.

The nonionic surfactant may also comprise a compound of formula (Id),

$$R^3\phi(OCH_2CH_2)_mOH \quad \text{(Id)}$$

wherein $R^3$ represents a substituted or unsubstituted alkyl group; Φ is an aromatic group; and m is an integer from 4 to 6.

The reaction mixture may further include a co-surfactant, preferably an alcohol.

Introduction of this solvent shifted concentrate is facilitated by surfactants that surface functionalize the nanoparticles. Preferred surfactants are carboxylic acids such as oleic acid, linoleic acid, stearic acid, and palmitic acid. In general, the preferred materials are carboxylic acids with carbon chain lengths less than 20 carbon atoms but greater than 3 carbon atoms.

The nonpolar diluent included in the substantially homogeneous dispersion is advantageously selected from among hydrocarbons containing about 6-20 carbon atoms, for example, octane, decane, kerosene, toluene, naphtha, diesel fuel, biodiesel, and mixtures thereof. When used as a fuel additive, one part of the homogeneous dispersion is with at least about 100 parts of the fuel.

In accordance with the invention, the transition metal is preferably selected from the group consisting of Fe, Mn, Cr, Ni, W, Co, V, Cu, Mo, Zr, Y and combinations thereof. Preferred transition metals are Zr or Y, more preferably combined with Fe.

It may be beneficial to form a ceramic oxide coating on the interior surfaces of diesel engine cylinders in situ. The potential benefits of the coating include added protection of the engine from thermal stress; for example, $CeO_2$ melts at 2600° C., whereas cast iron, a common material used in the manufacture of diesel engines, melts at about 1200-1450° C. Even 5 nm ceria particles have demonstrated the ability to protect steel from oxidation for 24 hours at 1000° C., so the phenomenon of size dependent melting would not be expected to lower the melting point of the cerium dioxide nanoparticles of the invention below the combustion temperatures encountered in the engine. See, for example, Patil et al., *Journal of Nanoparticle Research*, vol. 4, pp 433-438 (2002). An engine so protected may be able to operate at higher temperatures and compression ratios, resulting in greater thermodynamic efficiency. A diesel engine having cylinder walls coated with cerium dioxide would be resistant to further oxidation ($CeO_2$ being already fully oxidized), thereby preventing the engine from "rusting." This is important because certain additives used to reduce carbon emissions or improve fuel economy such as, for example, the oxygenates MTBE, ethanol and other cetane improvers such as peroxides, also increase corrosion when introduced into the combustion chamber, which may result in the formation of rust and degradation of the engine lifetime and performance. The coating should not be so thick as to impede the cooling of the engine walls by the water recirculation cooling system.

In one embodiment, the current invention provides transition metal-containing, crystalline, cerium dioxide nanoparticles having a mean hydrodynamic diameter of less than about 10 nm, preferably less than about 8 nm, more preferably 6 nm or even less, that are useful as a fuel additive for diesel engines. The surfaces of the cerium dioxide nanoparticles may be modified to facilitate their binding to an iron surface, and desirably would, when included in a fuel additive composition, rapidly form a ceramic oxide coating on the surface of diesel engine cylinders.

In one embodiment, a transition metal having a binding affinity for iron is incorporated onto the surface of the cerium dioxide nanoparticles. Examples of iron surfaces include those that exist in many internal parts of engines. Suitable transition metals include Mn, Fe, Ni, Cr, W, Co, V, Cu, Zr, and Y. The transition metal ion, which is incorporated into the cerium dioxide nanoparticles by occupying a cerium ion lattice site in the crystal, may be introduced during the latter stages of the precipitation of cerium dioxide. The transition metal ion can be added in combination with cerous ion, for example, in a single jet manner in which both cerous ion and transition metal ion are introduced together into a reactor containing ammonium hydroxide. Alternatively, the transition and cerous ions can be added together with the simultaneous addition of hydroxide ion. The transition metal-containing particles can also be formed in a double jet reaction of cerous ion with dissolved transition metal ion titrated against an ammonium hydroxide steam simultaneously introduced by a second jet. Critically, it is understood that sufficient nanoparticle stabilizer is present to prevent agglomeration of the nascent particles.

The surfactant/stabilizer combination may have the added benefit of aiding in the solvent shift process from the aqueous polar medium to the non-polar oil medium. In a combination of charged and uncharged surfactants, the charged surfactant compound plays a dominant role in the aqueous environment. However, as solvent shifting occurs, the charged compound is likely to be solubilized into the aqueous phase and washed out, and the uncharged compound becomes more important in stabilizing the reverse micelle emulsion.

Dicarboxylic acids and their derivatives, so called "gemini carboxylates", where the carboxylic groups are separated by at most two methylene groups, are also useful cerium dioxide nanoparticle stabilizers. Additionally, $C_2$-$C_8$ alkyl, alkoxy and polyalkoxy substituted dicarboxylic acids are advantageous stabilizers.

In accordance with the invention, nanoparticle stabilizer compounds preferably comprise organic carboxylic acids such as, for example, 2-[2-(2-methoxyethoxy)ethoxy]acetic acid (MESA) and ethylenediaminetetraacetic acid (EDTA), lactic acid, gluconic acid, tartaric acid, citric acid, and mixtures thereof.

Motor oil is used as a lubricant in various kinds of internal combustion engines in automobiles and other vehicles, boats, lawn mowers, trains, airplanes, etc. Engines contain contacting parts that move against each other at high speeds, often for prolonged periods of time. Such rubbing motion causes friction, forming a temporary weld, immobilizing the moving parts. Breaking this temporary weld absorbs otherwise useful power produced by the motor and converts the energy to useless heat. Friction also wears away the contacting surfaces of those parts, which may lead to increased fuel consumption and lower efficiency and degradation of the motor. In one aspect of the invention, a motor oil includes a lubricating oil, transition metal-containing, crystalline, cerium dioxide nanoparticles, desirably having a mean diameter of less than about 10 nm, more preferably about 5 nm, and optionally a surface adsorbed stabilizing agent.

Diesel lubricating oil is essentially free of water (preferably less than 300 ppm) but may be desirably modified by the addition of a cerium dioxide composition in which the cerium dioxide has been solvent shifted from its aqueous environment to that of an organic or non-polar environment. The cerium dioxide compositions include nanoparticles having a mean diameter of less than about 10 nm, more preferably about 5 nm, as already described. A diesel engine operated with modified diesel fuel and modified lubricating oil provides greater efficiency and may, in particular, provide improved fuel mileage, reduced engine wear or reduced pollution, or a combination of these features.

Metal polishing, also termed buffing, is the process of smoothing metals and alloys and polishing to a bright, smooth mirror-like finish. Metal polishing is often used to enhance cars, motorbikes, antiques, etc. Many medical instruments are also polished to prevent contamination in irregularities in the metal surface. Polishing agents are also used to polish optical elements such as lenses and mirrors to a surface smoothness within a fraction of the wavelength of the light they are to manage. Smooth, round, uniform cerium dioxide particles of the present invention may be advantageously employed as polishing agents, and may further be used for planarization (rendering the surface smooth at the atomic level) of semiconductor substrates for subsequent processing of integrated circuits.

The invention is further illustrated by the following examples, which are not intended to limit the invention in any manner.

Example 1. Preparation of Cerium Dioxide Nanoparticles by Single-Jet Addition

To a 3 liter round bottom stainless steel reactor vessel was added 1.267 liters of distilled water, followed by 100 ml of $Ce(NO_3)_3 \cdot 6H_2O$ solution (600 gm/liter $Ce(NO_3)_3 \cdot 6H_2O$). The solution was clear and had a pH of 4.2 at 20° C. Subsequently, 30.5 gm of 2-[2-(2-methoxyethoxy)ethoxy] acetic acid (MEEA) was added to the vessel. The solution remained clear, and the pH was 2.8 at 20° C. A high sheer mixer, a colloid mill manufactured by Silverson Machines, Inc. that had been modified to enable reactants to be introduced directly into the mixer blades by way of a peristaltic tubing pump, was lowered into the reactor vessel, the mixer head being positioned slightly above the bottom of the reactor vessel. The mixer was set to 5,000 rpm, and 8.0 gm of 30% $H_2O_2$ was added to the reactor vessel. Then 16 ml of 28%-30% $NH_4OH$, diluted to 40 ml, was pumped into the reactor vessel by way of the mixer head in about 12 seconds. The initially clear solution turned an orange/brown in color. The high sheer mixer was removed, and the reactor vessel was moved to a temperature-controlled water jacket, where a mixer with an R-100 propeller was used to stir the solution at 450 rpm. The pH was 3.9 at 25° C. at 3 minutes after pumping the $NH_4OH$ into the reactor. The temperature of the reactor vessel was raised to 70° C. over the next 25 minutes, at which time the pH was 3.9. The solution temperature was held at 70° C. for 20 minutes, during which time the solution color changed from orange brown to a clear dark yellow. The pH was 3.6 at 70° C. The temperature was lowered to 25° C. over the next 25 minutes, at which time the pH was 4.2 at 25° C. Particle size analysis by dynamic light scattering indicated a cerium dioxide intensity weighted hydrodynamic diameter of 6 nm. The dispersion was then diafiltered to a conductivity of 3 mS/cm and concentrated, by a factor of about 10, to a nominal 1 Molar in $CeO_2$ particles.

The cerium dioxide particles were collected, the excess solvent evaporated off, and the gravimetric yield, corrected for the weight of MESA, was determined to be 62.9%.

Figure 1B:
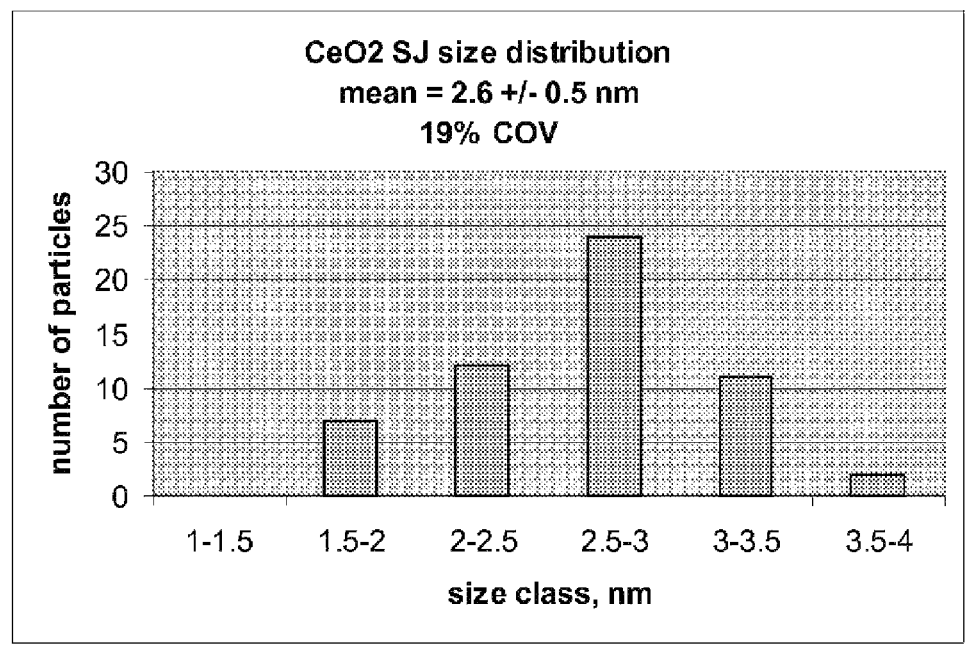

A transmission electron microscope (TEM) was used to analyze the cerium dioxide particles. A 9-microliter solution (0.26M) was dried onto a grid and imaged to produce the image shown in FIG. 1. The particles show no signs of agglomeration, even in this dried-down state. In solution, the particles would be expected to show even less propensity to agglomerate. The size frequency distribution of the cerium dioxide particles (plotted in FIG. 1), determined by transmission electron micrography (TEM), yields a geometric diameter of about 2.6 nm. Additionally, the size distribution is substantially monomodal, i.e., only one maximum, and uniform, 19% COV, with most of the particles falling in the range 2 nm to 4 nm.

Figure 2:
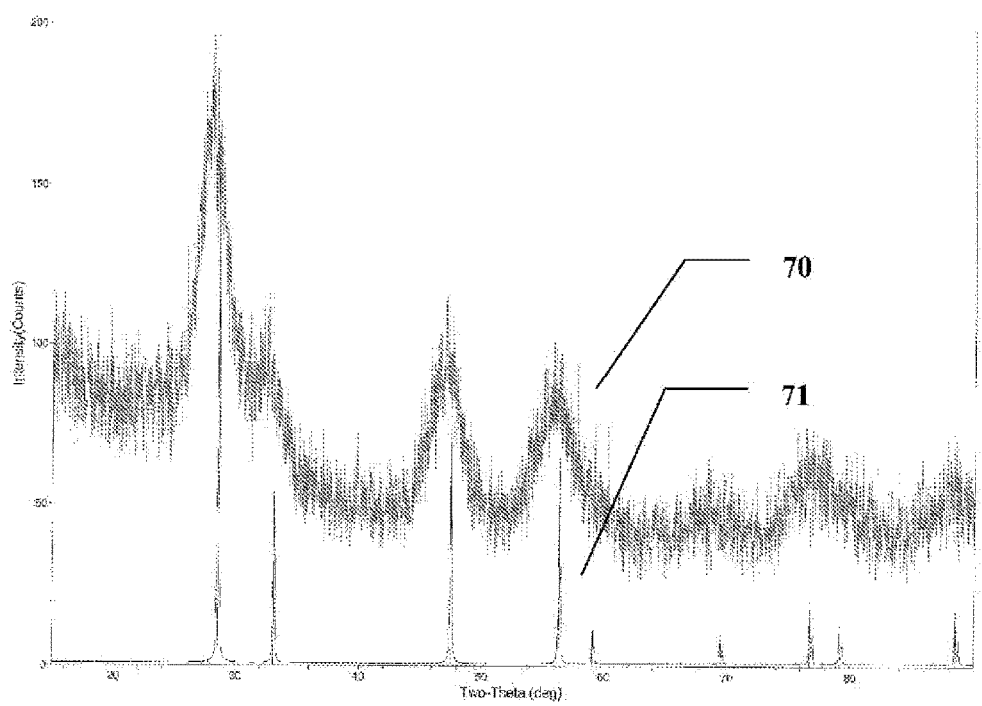
FIG. 2 is an X-ray powder diffraction spectrum of cerium dioxide nanoparticles prepared as described in Example 1.

FIG. 2 shows an X-ray powder diffraction pattern 70 of a sample of the dried cerium dioxide nanoparticles, together with a reference spectrum 71 of cerium dioxide that was provided by the NIST (National Institute of Standards and Technology) library. The line positions in the sample spectrum match those of the standard spectrum. The two theta peak widths were very wide in the sample spectrum, which is consistent with a very small primary crystallite size and particle size. From the X-ray data (Cu K alpha line at about 8047 ev) and the Scherrer formula (d=0.9*lambda/delta*cos (theta), where lambda is the x-ray wavelength, delta the full width half maximum, and theta the scattering angle corresponding to the x ray peak), the primary crystallite size was calculated to be 2.5±0.5 nm (95% confidence of 5 replicas). Since the particle itself is the size of this crystallite, there is only one crystal per particle, therefore we refer to this composition as crystalline cerium dioxide to distinguish it from all previous art in which the nanoparticles are comprised of agglomerates of crystallites of various sizes.

Example 2. Precipitation of ~1.5 nm $CeO_2$ Nanoparticles

Figure 3A:
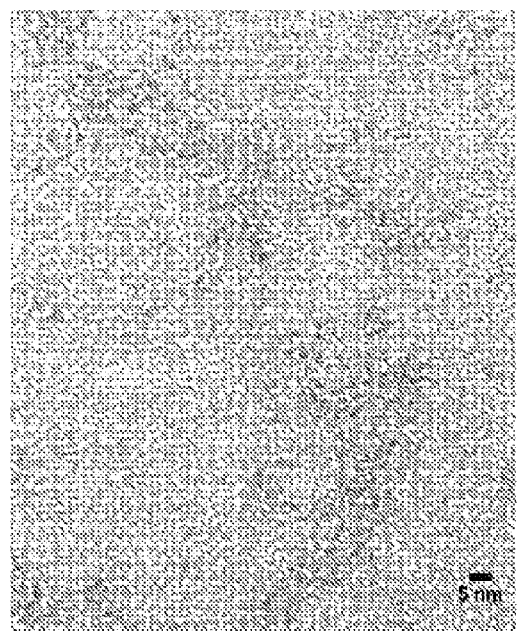
FIG. 3A is a TEM image of 1.1 nm $CeO_2$ nanoparticles prepared as described in Example 2.
Figure 3B:
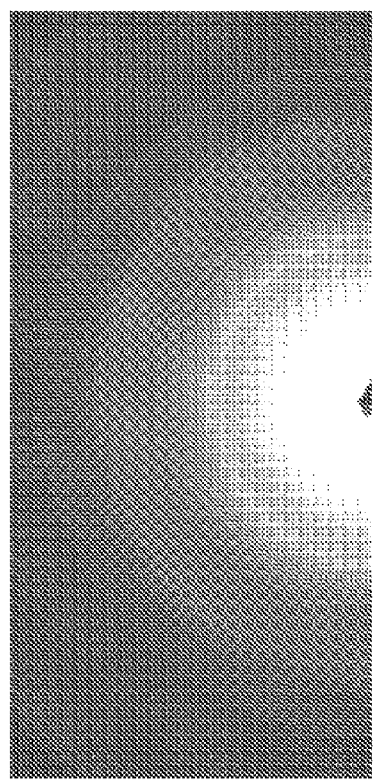
FIG. 3B is an electron diffraction pattern of these 1.1 nm particles.

This precipitation follows Example 1, except that the stabilizer combination of EDTA and lactic acid in the ratio 20:80 and at a level of 76.4 gm EDTA disodium salt and 74.0 gm of 85% lactic acid is used instead of the MEEA stabilizer FIG. 3A is a high magnification TEM indicating a grain size substantially smaller than 5 nm and estimated to be 1.1+/− 0.3 nm. FIG. 3B represents the electron diffraction pattern of a representative sample of the precipitation. FIG. 3C contains Table I in which the intensities of the various diffractions rings {311}, {220}, {200} and {111} are analyzed within the framework of: cubic CeO2, cubic and hexagonal $Ce_2O_3$ and $Ce(OH)_3$. Clearly the percent deviations of analyzed ring intensity with crystal habit are minimal for the cubic fluorite structure of $CeO_2$, thus establishing the existence of this polymorph down to this grain diameter.

Figure 4A:
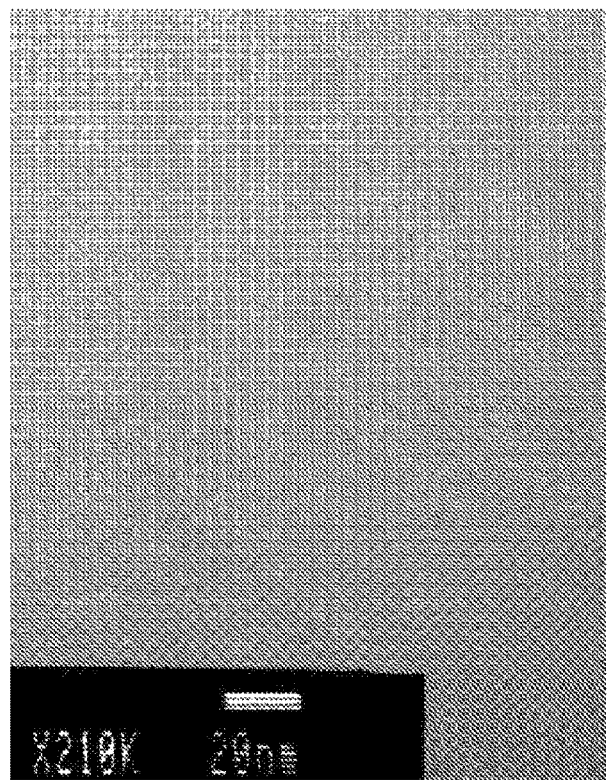
FIGS. 4A and 4B are, respectively, a TEM image and a particle size-frequency analysis by TEM of isothermally precipitated $CeO_2$ nanoparticles, prepared by a triple jet process as described in Example 3.
Figure 4B:
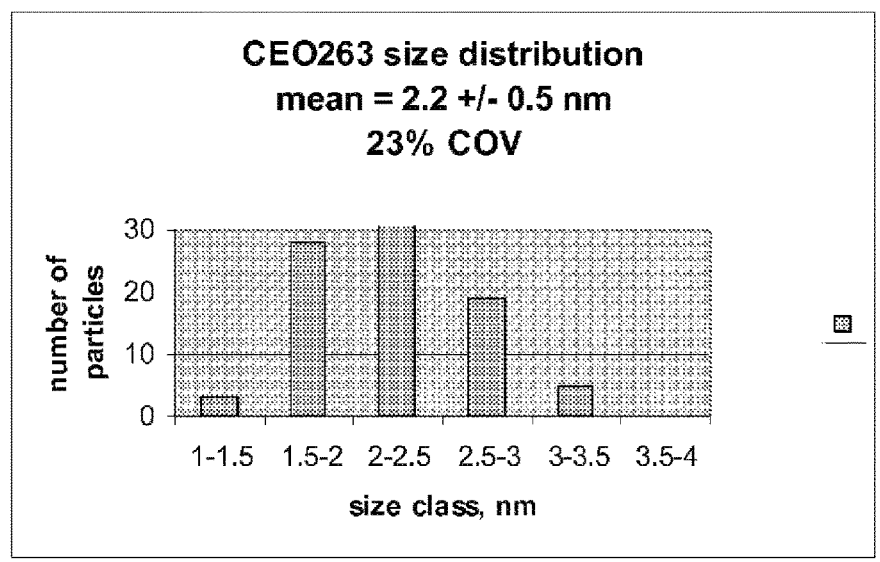

Example 3. Preparation of $CeO_2$ Nanoparticles by Isothermal Double-Jet Precipitation $CeO_2$ To a 3 liter round bottom stainless steel reactor vessel was added 1117 grams of distilled water. A standard Rv 100 propeller was lowered into the reactor vessel, and the mixer head was positioned slightly above the bottom of the reactor vessel. The mixer was set to 700 rpm, and the reactor was brought to a temperature of about 70° C. Then 59.8 grams (98%) of methoxyacetic acid were added to the reactor. A double jet precipitation was conducted over a period of five minutes by pumping a 250 ml solution containing 120.0 grams of $Ce(NO_3)_3 \cdot 6H_2O$ into the reactor concurrently with a solution containing 69.5 grams (28-30%) of ammonium hydroxide. A distilled water chase into the reactor cleared the reactant lines of residual materials. Then 10.2 grams of 50% non-stabilized hydrogen peroxide was added to the reactor and its contents over a period of 40 seconds. Initially, the reaction mixture was an opaque dark orange brownish liquid in the pH range 6 to 7. The reaction mixture was heated for an additional 60 minutes, during which time the pH dropped to 4.25 (consistent with the release of hydronium ion via reactions (3a) and (3b) and the mixture became clear yellow orange color. The reaction was cooled to 20° C. and diafiltered to a conductivity of 3 mS/cm to remove excess water and unreacted materials. This resulted in concentrating the dispersion by a factor of about 10, or nominally 1 Molar in $CeO_2$ particles. Particle size-frequency analysis by transmission electron micrography (FIG. 4) revealed a mean particle size of 2.2 nm, with size frequency distribution having a coefficient of variation, COV, (one standard deviation divided by the mean diameter) of 23%. The calculated yield was 62.9%.

Figure 5A:
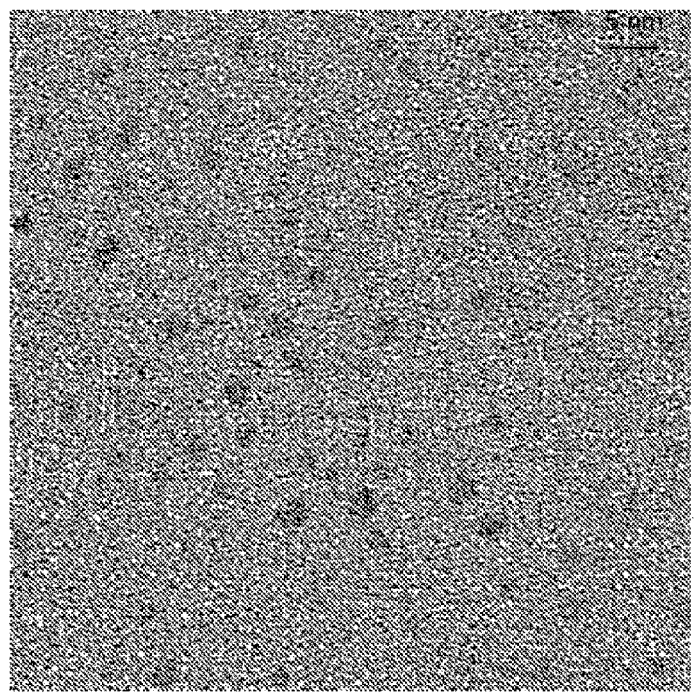
FIGS. 5A and 5B are, respectively, a TEM image and a particle size-frequency analysis by TEM of isothermally precipitated Cu-containing $CeO_2$ nanoparticles, prepared as described in Example 4.
Figure 5B:
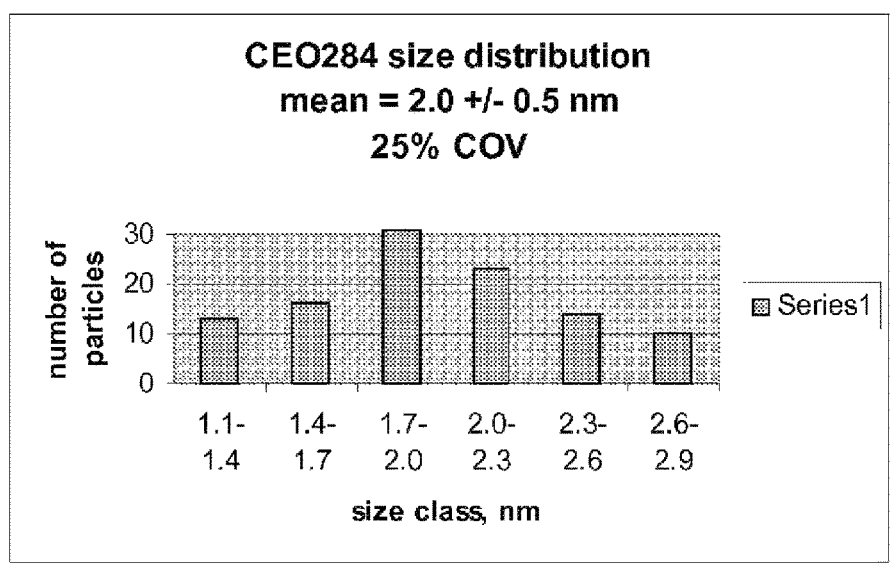

Example 4. Copper-Containing $CeO_2$ Nanoparticles $Ce_{0.9}Cu_{0.1}O_{1.95}$ The conditions of example 3 were repeated, except that the cerium nitrate solution contained 108.0 grams of cerium nitrate hexahydrate, and 6.42 grams of $Ce(NO_3)_3 \cdot 2.5H_2O$. These metal salts were dissolved separately and then combined to form a 250 ml solution. The reaction proceeded as described in Example 3 except that the hydrogen peroxide was added over a period of 40 seconds after the cerium and ammonia had been added. Particle size-frequency analysis by transmission electron micrography (FIG. 5) revealed a mean particle size of 2.5 nm, with size frequency distribution having a coefficient of variation, COV, (one standard deviation divided by the mean diameter) of 25%. Note the absence of a bi-modal distribution; a secondary peak would be an indication that the Cu was not incorporated into the $CeO_2$ lattice but instead existed as a separate $Cu_2O_3$ population.

Example 5. Iron-Containing $CeO_2$ Nanoparticles $Ce_{0.9}Fe_{0.1}O_{1.95}$ (CeO-255)

The conditions of Example 4 were repeated, except that the metal salts solution contained 108.0 grams of cerium nitrate hexahydrate, and 11.16 grams of $Fe(NO_3)_3 \cdot 9H_2O$. These metal salts were dissolved separately and then combined to form a 250 ml solution. The reaction proceeded as described in Example 4. A TEM of the precipitated particles (FIG. 6A) and particle size-frequency analysis by transmission electron micrography (FIG. 6B) revealed a mean particle size of 2.2+/−0.7 nm, with size frequency distribution having a coefficient of variation, COV, (one standard deviation divided by the mean diameter) of 32%. The calculated yield was 55.1%.

Example 6. Zirconium-Containing $CeO_2$ Nanoparticles $Ce_{0.9}Zr_{0.15}O_2$ (CeO 257)

Figure 7A:
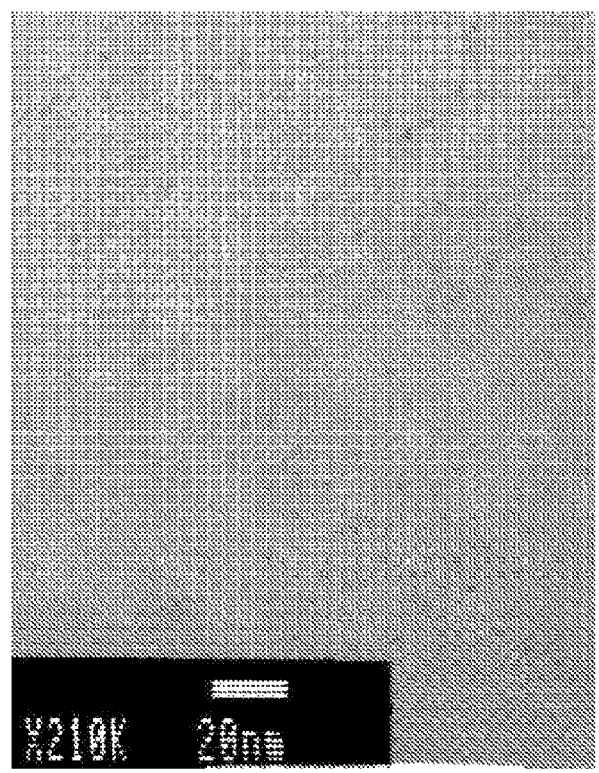
FIGS. 7A and 7B are, respectively, a TEM image and a particle size-frequency analysis by TEM of isothermally precipitated Zr-containing $CeO_2$ nanoparticles, prepared as described in Example 6.
Figure 7B:
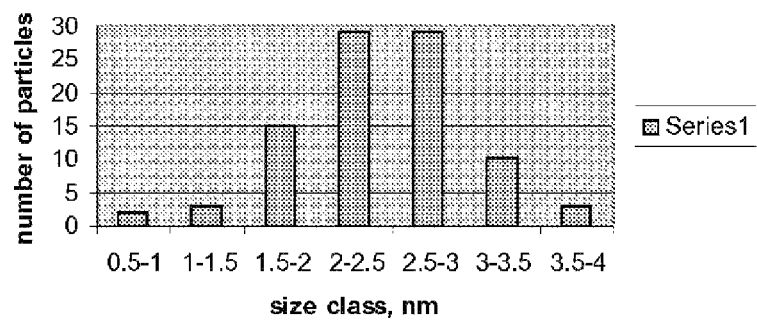

The conditions of Example 4 were repeated except that the metal salts solution contained 101.89 grams of cerium nitrate hexahydrate, and 9.57 grams of $ZrO(NO_3)_2 \cdot 6H_2O$. These metal salts were dissolved separately and then combined to form a 250 ml solution. The reaction proceeded as described in Example 4, except that the temperature of the reaction was carried out at 85° C. Particle size-frequency analysis by transmission electron micrography (FIG. 7A) revealed a mean particle size of 2.4+/−0.7 nm, with size frequency distribution having a coefficient of variation, COV, (one standard deviation divided by the mean diameter) of 29%. Inductively coupled plasma atomic emission spectroscopy revealed a stoichiometry of $Ce_{0.82}Zr_{0.18}O_{1.91}$, which given the relative insolubility of $ZrO_2$ to $CeO_2$, would account for the enhanced Zr content (18% vs 15%).

Example 7a. Zirconium- and Iron-Containing $CeO_2$ Nanoparticles $Ce_{0.9}Zr_{0.15}Fe_{0.1}O_{1.95}$ (CeO-270)

The conditions of Example 4 were repeated, except that the metal salts solution contained 84.0 grams of cerium nitrate hexahydrate, 11.16 grams of $Fe(NO_3)_3 \cdot 9H_2O$ and 12.76 grams of $ZrO(NO_3)_2 \cdot 6H_2O$. These metal salts were dissolved separately and then combined to form a 250 ml solution. The reaction proceeded as described in Example 4, except that the temperature of the reaction was carried out at 85° C., and the hydrogen peroxide solution (50%) was elevated to 20.4 gm and added over a period of ten minutes. Particle TEM (FIG. 8A) and particle size-frequency analysis by transmission electron micrography (FIG. 8B) revealed a mean particle size of 2.2+/−0.6 nm, with size frequency distribution having a coefficient of variation, COV, (one standard deviation divided by the mean diameter) of 27%. Again, a monodisperse, unimodal distribution supports the idea of co-incorporation as opposed to separately renucleated $ZrO_2$ and $Fe_2O_3$ grain populations. The calculated yield was 78%. Inductively coupled plasma atomic emission spectroscopy revealed a stoichiometry of $Ce_{0.69}Fe_{0.14}Zr_{0.17}O_{0.915}$. Again, the relatively more concentrated Fe and Zr with respect to the nominal amounts reflects the greater insolubility of their hydroxide precursors relative to that of cerium hydroxide. Also in FIG. 8C is an x-ray powder diffraction pattern of this sample (top curve) compared to the transition metal free $CeO_2$. The lack of a peak (denoted by an arrow) at 32 deg two theta means that there is no free $ZrO_2$, i.e., it is all incorporated into the cerium lattice. Also, the lack of peaks at 50 and 52 degrees two theta indicate no separate population of $Fe_2O_3$ (ie incorporation of Fe into the cerium lattice). Note the shift to larger 2 theta at large two theta scattering angle, which indicates a distortion or contraction of the lattice—($n\lambda/2d=\sin \theta$) which is consistent with the smaller ionic radii of $Fe^{3+}$ (0.78 A) and $Zr^{4+}$ (0.84 A) relative to the $Ce^{4+}$ (0.97 A) which it is replacing. Thus, we conclude that the transition metals are incorporated into the $CeO_2$ lattice and do not represent a separate population of neat $ZrO_2$ or $Fe_2O_3$ nanoparticles. The unimodal size-frequency distribution also supports this conclusion.

Examples 7b-f Zirconium- and Iron Containing $CeO_2$ Nanoparticles Varying Systematically in the Amount of Iron (15%, 20%, 25%, 30%) at 15% Zirconium and 20% Iron at 20% Zirconium The conditions of Example 7a were followed; however the amount of iron or zirconium was adjusted to give the nominal stoichiometries indicated, using the appropriate metal containing salt solution while the overall cerium nitrate hexahydrate was reduced to accommodate the increased concentration of the iron or zirconium transition metal.

Figure 9:
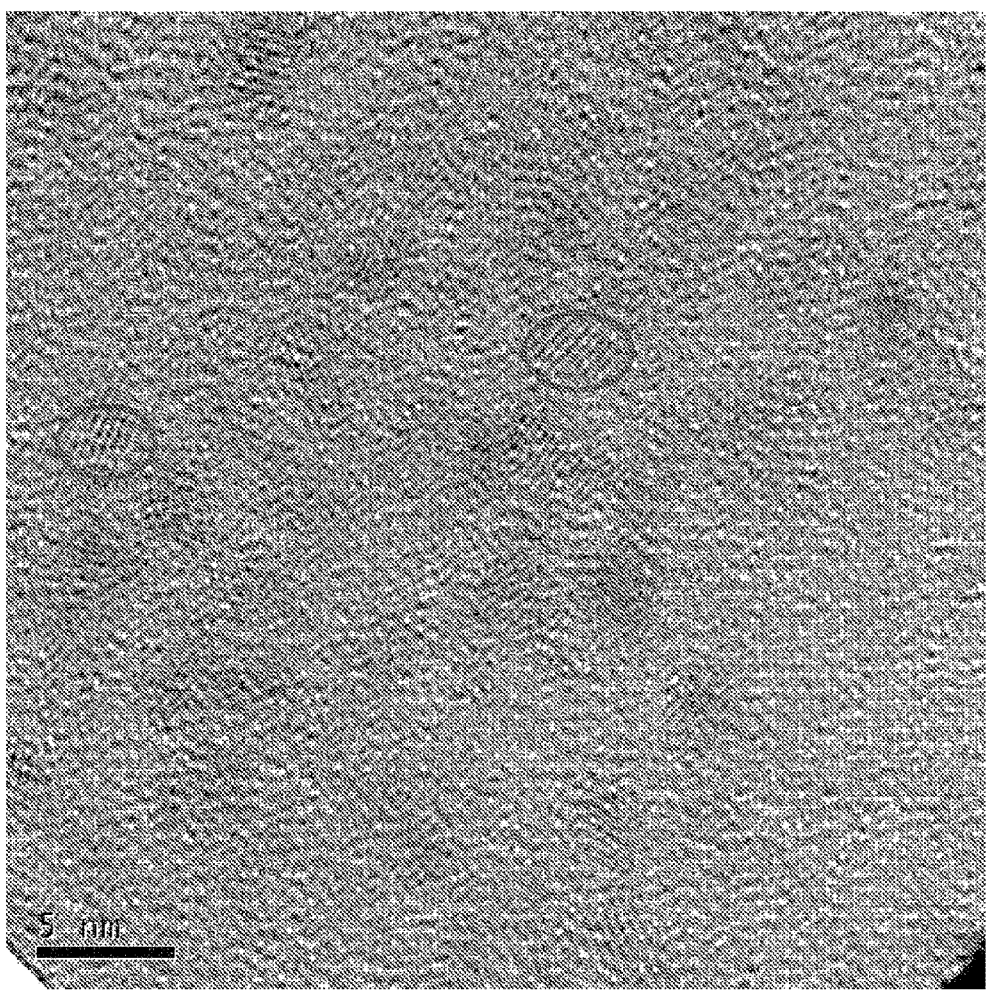
FIG. 9 is a field emission gun TEM lattice image of $CeO_2$ nanoparticles containing Zr and Fe, prepared as described in Example 7.

FIG. 9 is a Field Emission Gun TEM lattice image of the particles made in Example 1. Two of the particles are circled for clarity. Note the small number of lattice planes that define a single crystal having a diameter of less than 5 nm.

Aqueous sols of various materials were heated for 30 minutes in a muffle furnace at 1000° C. These thoroughly dried samples were measured for OSC and the kinetics at which they reached their maximum OSC using thermogravimetric techniques, as described by Sarkas et al., "Nanocrystalline Mixed Metal Oxides-Novel Oxygen Storage Materials," *Mat. Res. Soc. Symp. Proc.* Vol. 788, L4.8.1 (2004). Typically, one observes a very fast initial reduction rate in nitrogen gas containing 5% hydrogen, followed by a second slower rate.

The accompanying TABLE 2 contains the Oxygen Storage Capacity (1 sigma reproducibility in parenthesis) and the fast (k1) and slow (k2) rate constants (1 standard deviation in parenthesis) for reduction of various lattice engineered ceria nanoparticles (all 2 nm except the Sigma Aldrich control) in a nitrogen gas at 700° C. containing 5% $H_2$. These values have been cross-checked against a second TGA instrument (average 2.6% difference), against gas flow differences (average 1% deviation) and replicate sample preparation at 1000° C. for 30 minutes (average 1.54% deviation). From the entries in TABLE 2, we see that the OSC of cerium dioxide particles does not appear to be size-dependent in the range of about 2 nm-20 µm. This may be a consequence of sintering to larger particles. Note that OSC increases approximately by 50% with the addition of zirconium and is accompanied by a 10× rate increase. Furthermore, the addition of iron to the Zr-containing material affords nearly three times the OSC at a 10-fold rate compared to cerium dioxide particles containing no transition metal ions. These values are more than triple the values in the cited reference. The beneficial effect of citric acid on the reduction rate constant seems to suggest that the stabilizer may have an effect on the particle surface area or morphology even after it has been pyrolyzed.

TABLE 2

Comparison of OSC for Cerium Dioxide Nanoparticle Variations

| Sample | OSC (µmoles/g) (Std. Dev. µmoles/g) | Reduction Rate constant k1 × 10^3 (/min) (std dev.) | Reduction Rate constant k2 × 10^3 (/min) (std dev.) |
|---|---|---|---|
| Sigma Aldrich $CeO_2$ (20 µm) | 296 (1.65) | | |
| $CeO_2$ (2 nm) | 349 | | |
| $CeFe_{0.10}O_2$ | 470 (1% surf) | | |
| $CeZr_{0.15}O_2$ | 592 (3) | | |
| $CeZr_{0.15}Fe_{0.10}O_2$ | 1122 (3) | 3.1 (0.4) | 0.9 (0.15) |
| $CeZr_{0.15}Fe_{0.15}O_2$ | 1359 (33) | 5.9 (0.04) | 2.0 (0.2) |
| $CeZr_{0.15}Fe_{0.20}O_2$ | 1653 (6) | 3.4 (0.4) | 1.1 (0.3) |
| $CeZr_{0.15}Fe_{0.25}O_2$ | 2013 (1) | 3.1 (0.4) | 1.1 (0.2) |
| $CeZr_{0.15}Fe_{0.30}O_2$ | 2370 (4) | 2.6 (0.1) | 1.0 (0.1) |
| $CeZr_{0.20}Fe_{0.20}O_2$ | 1661 (7) | 4.9 (1.3) | 1.2 (0.2) |
| $CeZr_{0.20}Fe_{0.20}O_2$ citric acid | 1636 (1) | 9.5 (0.6) | 3.9 (0.2) |

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed:

1. A process for making lattice engineered crystalline cerium dioxide nanoparticles containing at least one metal (M), said process comprising:

(a) providing an aqueous reaction mixture comprising a source of cerous ion, a source of one or more metal ions (M), a source of hydroxide ion, at least one water-soluble nanoparticle stabilizer, and an oxidant, wherein the metal ions (M) are ions of elements selected from the group consisting of rare earth metals and transition metals, and wherein said at least one water-soluble nanoparticle stabilizer comprises a compound selected from the group consisting of alkoxy substituted carboxylic acids, α-hydroxyl carboxylic acids, α-keto carboxylic acids, and polyacids, wherein said alkoxy substituted carboxylic acid comprises a compound of formula (Ia):

$$R-O-(CH_2CH_2O)_n CHR^1 CO_2 Y \qquad (Ia)$$

wherein:
    R represents a methyl or an ethyl group;
    $R^1$ represents a hydrogen or an alkyl group;
    Y represents a hydrogen or a counter ion; and
    n is an integer from 0 to 5;

(b) shearing said mixture, thereby forming a homogeneously distributed suspension of cerium hydroxide nanoparticles; and (c) providing temperature conditions in the homogeneously distributed suspension of cerium hydroxide nanoparticles effective to enable oxidation of cerous ion to ceric ion, thereby forming a dispersion comprising metal-containing cerium dioxide nanoparticles, $Ce_{1-x}M_xO_2$, wherein "x" has a value from about 0.02 to about 0.8, said nanoparticles having a crystalline cubic fluorite structure, a mean hydrodynamic diameter in the range of about 1 nm to about 10 nm, and wherein a size distribution of said nanoparticles has a coefficient of variation of less than 32%.

2. The process according to claim 1 wherein said mechanical shearing is effected in a colloid mill.

3. The process according to claim 1 wherein said temperature conditions effective to enable oxidation of cerous ion to ceric ion comprise a temperature of about 50° C. to about 100° C.

4. The process according to claim 3 wherein said temperature conditions effective to enable oxidation of cerous ion to ceric ion comprise a temperature of about 60° C. to about 90° C.

5. The process according to claim 1 wherein said sources of ions are introduced into said reaction mixture either concurrently or sequentially during said mechanical shearing.

6. The process according to claim 1 wherein said metal-containing cerium dioxide nanoparticles have a mean hydrodynamic diameter of about 8 nm or less.

7. The process according to claim 1, wherein the at least one water-soluble nanoparticle stabilizer comprises a compound selected from the group consisting of lactic acid, gluconic acid enantiomers, ethylenediaminetetraacetic acid, tartaric acid, citric acid, pyruvic acid, methoxy acetic acid, 2-(methoxy)ethoxy acetic acid, 2-[2-(2-methoxyethoxy) ethoxy] acetic acid, 2-hydroxybutanoic acid, and combinations thereof.

8. A process for making lattice engineered crystalline cerium dioxide nanoparticles containing at least one metal (M), said process comprising:

(a) providing an aqueous reaction mixture comprising a source of cerous ion, a source of one or more metal ions (M), a source of hydroxide ion, at least one water-soluble nanoparticle stabilizer, and an oxidant, wherein the metal ions (M) are ions of elements selected from the group consisting of rare earth metals and transition metals, and wherein said at least one water-soluble nanoparticle stabilizer comprises a compound selected from the group consisting of alkoxy substituted carboxylic acids, α-hydroxyl carboxylic acids, α-keto carboxylic acids, and polyacids, wherein said alkoxy substituted carboxylic acid comprises a compound of formula (Ia):

$$R-O-(CH_2CH_2O)_n CHR^1CO_2Y \qquad (Ia)$$

wherein:
R represents a methyl or an ethyl group;
$R^1$ represents a hydrogen or an alkyl group;
Y represents a hydrogen or a counter ion; and
n is an integer from 0 to 5;
(b) shearing said mixture, thereby forming a homogeneously distributed suspension of cerium hydroxide nanoparticles; and
(c) providing temperature conditions in the homogeneously distributed suspension of cerium hydroxide nanoparticles effective to enable oxidation of cerous ion to ceric ion, thereby forming a dispersion comprising metal-containing cerium dioxide nanoparticles, $Ce_{1-x}M_xO_2$, wherein "x" has a value from about 0.02 to about 0.8, said nanoparticles having a crystalline cubic fluorite structure, a mean hydrodynamic diameter in the range of about 1 nm to about 10 nm, and a geometric diameter of less than 4 nm.

* * * * *